(12) United States Patent
Chen et al.

(10) Patent No.: US 10,009,343 B2
(45) Date of Patent: Jun. 26, 2018

(54) METHOD, APPARATUS, AND SYSTEM FOR AUTHENTICATING FULLY HOMOMORPHIC MESSAGE

(71) Applicant: HUAWEI TECHNOLOGIES CO.,LTD., Shenzhen, Guangdong (CN)

(72) Inventors: Wenbin Chen, Chengdu (CN); Hao Lei, Beijing (CN); Qinqin Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 226 days.

(21) Appl. No.: 14/985,883

(22) Filed: Dec. 31, 2015

(65) Prior Publication Data

US 2016/0119346 A1    Apr. 28, 2016

Related U.S. Application Data

(63) Continuation of application No. PCT/CN2015/072570, filed on Feb. 9, 2015.

(30) Foreign Application Priority Data

Jun. 30, 2014 (CN) .......................... 2014 1 0309571

(51) Int. Cl.
*H04L 29/06* (2006.01)
*H04L 9/00* (2006.01)
*H04L 9/32* (2006.01)

(52) U.S. Cl.
CPC .......... *H04L 63/0876* (2013.01); *H04L 9/008* (2013.01); *H04L 9/3223* (2013.01);
(Continued)

(58) Field of Classification Search
CPC ... H04L 63/0876; H04L 63/123; H04L 9/008; H04L 9/3223; H04L 63/126; H04L 63/0442; H04L 63/0861
(Continued)

(56) References Cited

U.S. PATENT DOCUMENTS

2009/0158054 A1    6/2009  Dijk et al.
2011/0110525 A1    5/2011  Gentry
(Continued)

FOREIGN PATENT DOCUMENTS

CN    102012980 A    4/2011
CN    102082665 A    6/2011
CN    103475472 A    12/2013

OTHER PUBLICATIONS

Feng, Yansheng et al., "Secure and Verifiable Outsourcing of Sequence Comparisons," K. Mustafa et al. (Eds.), ICT-EurAsia 2013, LNCS 7804, Mar. 25, 2013, IFIP Intl. Federation for Information Processing, pp. 243-252, XP047388578.
(Continued)

*Primary Examiner* — Jeffrey C Pwu
*Assistant Examiner* — Nega Woldemariam
(74) *Attorney, Agent, or Firm* — Huawei Technologies Co., Ltd.

(57) ABSTRACT

Embodiments of the present disclosure provide a method, an apparatus, and a system for authenticating a fully homomorphic message, where the method includes: acquiring a message authentication key, where: the message authentication key includes a public key, a first character string, and a second character string; the first character string is a character string that consists of 0 and 1 and has a length of n; the second character string is a character string that consists of 0 and 1 and has a length of n; generating an authentication fingerprint corresponding to each bit of to-be-
(Continued)

computed data; sending a computation request to a server; receiving an authentication fingerprint corresponding to the computation result; and performing correctness authentication on the computation result according to the received authentication fingerprint, which effectively reduces an amount of computation in a verification process.

25 Claims, 6 Drawing Sheets

(52) U.S. Cl.
CPC ......... *H04L 63/123* (2013.01); *H04L 63/126* (2013.01); *H04L 63/0442* (2013.01); *H04L 63/0861* (2013.01)

(58) Field of Classification Search
USPC ........................................................ 713/170
See application file for complete search history.

(56) References Cited

U.S. PATENT DOCUMENTS

| | | |
|---|---|---|
| 2011/0243320 A1 | 10/2011 | Halevi et al. |
| 2012/0039473 A1 | 2/2012 | Gentry et al. |
| 2012/0054485 A1 | 3/2012 | Tanaka et al. |
| 2013/0247230 A1* | 9/2013 | Parann-Nissany ...... H04L 63/06 726/30 |
| 2013/0326224 A1* | 12/2013 | Yavuz ................... H04L 9/3247 713/176 |
| 2014/0185794 A1* | 7/2014 | Yasuda ................... H04L 9/008 380/28 |
| 2014/0310524 A1* | 10/2014 | Yamanaka ............ H04L 9/3242 713/170 |
| 2015/0121062 A1* | 4/2015 | Gajek ................. H04L 63/0471 713/153 |
| 2015/0170197 A1* | 6/2015 | Smith ................ G06Q 30/0242 705/14.41 |
| 2015/0215123 A1* | 7/2015 | Kipnis .................... H04L 9/008 380/46 |
| 2015/0288662 A1* | 10/2015 | Bilogrevic .......... H04L 63/0428 713/168 |
| 2015/0309863 A1* | 10/2015 | Shi ...................... H03M 13/373 714/819 |
| 2015/0365227 A1* | 12/2015 | Billau .................... H04L 9/002 713/194 |
| 2016/0133164 A1* | 5/2016 | Yoshida .................. G09C 1/00 713/189 |

OTHER PUBLICATIONS

Henry Carter et al., "Secure Outsourced Garbled Circuit Evaluation for Mobile Devices," 22nd USENIX Security Symposium, Aug. 14, 2013, pp. 289-304, XP061014449.

Sebastian Faust et al., "Outsourced Pattern Matching," F.V. Fomin et al. (Eds.), ICALP 2013, Part II, LNCS 7966, Springer Verlag, Berlin, Jul. 8, 2013, pp. 545-556, XP047035371.

Craig Gentry, "A Fully Homomorphic Encryption Scheme," Disseration for Stanford University Department of Computer Science, Sep. 1, 2009, total 209 pages. XP055389118.

Rosario Gennaro et al: "Fully Homomorphic Message Authenticators", 2012, total 16 pages.

Barbosa M et al: "Delegatable Homomorphic Encryption with Applications to Secure Outsourcing of Computation", International Association for Cryptologic Research, Aug. 29, 2011, pp. 1-29,XP61005208.

Bugiel Sven et al: "Twin Clouds: Secure Cloud Computing with Low Latency", IFIP International Federation for Information Processing, Oct. 19, 2011, pp. 32-44, XP47423166.

Craig Gentry et al: "Implementing Gentry''s Fully-Homomorphic Encryption Scheme", International Association for Cryptologic Research , Feb. 4, 2011, pp. 1-29, XP61004402.

Dario Fiore et al: "Efficiently Verifiable Computation on Encrypted Data", International Association for Cryptologic Research , Jun. 9, 2014, pp. 1-42,XP61016238.

* cited by examiner

… (1) …

METHOD, APPARATUS, AND SYSTEM FOR AUTHENTICATING FULLY HOMOMORPHIC MESSAGE

CROSS-REFERENCE TO RELATED APPLICATIONS

This application is a continuation of International Application No. PCT/CN2015/072570, filed on Feb. 9, 2015, which claims priority to Chinese Patent Application No. 201410309571.3, filed on Jun. 30, 2014, both of which are hereby incorporated by reference in their entireties.

TECHNICAL FIELD

Embodiments of the present disclosure relate to the field of computer and information technologies, and in particular, to a method, an apparatus, and a system for authenticating a fully homomorphic message.

BACKGROUND

A fully homomorphic encryption algorithm includes an algorithm for generating a public key, a private key, and a computation key, an encryption algorithm, a decryption algorithm, and a ciphertext computation function. The fully homomorphic encryption algorithm is mainly used to authenticate a computation result of distributed computation, that is, a technology for authenticating a fully homomorphic message.

Currently, a specific implementation manner of the technology for authenticating a fully homomorphic message is as follows: A terminal acquires a message authentication key, where the message authentication key includes a public key, a private key, and a computation key that are acquired according to the foregoing fully homomorphic encryption algorithm, and further includes a first character string and a second character string. The first character string is a subset of a randomly-generated set $\{1, 2, \ldots, n-1, n\}$ and has a length of n/2, and the second character string is a random character string that consists of 0 and 1 and has a length of n, where n is an integer greater than or equal to 2. The terminal generates an authentication fingerprint of each bit of to-be-computed data according to the message authentication key and the encryption algorithm in the foregoing fully homomorphic encryption algorithm, and sends the to-be-computed data, the authentication fingerprint, the message authentication key, and the foregoing fully homomorphic encryption algorithm together to a server. The server computes the to-be-computed data according to a pre-configured computation function used to compute the to-be-computed data to acquire a computation result, computes a first component of an authentication fingerprint of the computation result by using a pre-configured family of hash functions, computes each character of the first character string in the message authentication key according to the computation result, the authentication fingerprint of each bit of the to-be-computed data, and the foregoing computation key, and by using the ciphertext computation function in the foregoing fully homomorphic encryption algorithm, to acquire a second component of the authentication fingerprint of the computation result, to finally acquire an entire authentication fingerprint of the computation result, and returns the computation result and the authentication fingerprint of the computation result to the terminal. The terminal first recomputes a first component of the authentication fingerprint of the computation result according to the pre-configured family of hash functions to determine that the first component of the authentication fingerprint of the computation result that is obtained by means of recomputation is the same as the first component of the authentication fingerprint that is returned by the server; and then performs further authentication, for the $j^{th}$ bit of the to-be-computed data and the $i^{th}$ character of the first character string of the terminal, generates a pseudo random string rand (i, j) according to a pre-configured pseudo random function, inputs 0 and the rand (i, j) into the foregoing encryption algorithm to acquire an encryption ciphertext corresponding to 0 in the pseudo random string rand (i, j), performs computation according to the encryption ciphertext, the pre-configured computation function used to compute the to-be-computed data, and the computation key, and by using the ciphertext computation function in the fully homomorphic encryption algorithm, to acquire the $i^{th}$ second component of the authentication fingerprint of the computation result, performs n/2 times of such computation according to the foregoing method to acquire all second components of the authentication fingerprint of the computation result, and determines, by means of comparison, whether the second component of the authentication fingerprint of the computation result that is sent by the server are the same as the second components of the authentication fingerprint of the computation result that are acquired by the terminal. If the authentication fingerprint of the computation result that is sent by the server is the same as the authentication fingerprint of the computation result that is obtained by the terminal by means of recomputation, it is determined that the computation result is correct. A computation result of each bit of the to-be-computed data is verified according to the foregoing method.

However, because the first character string in the message authentication key consists of a subset of $\{1, 2, \ldots, n-1, n\}$ and has a length of n/2, computation of the authentication fingerprint of each bit of the to-be-computed data is complex. In addition, when an authentication server of the terminal returns the computation result, it is required to obtain the computation result by means of recomputation, and to perform n/2 times of computation on each bit of the to-be-computed data to acquire the second component of the authentication fingerprint corresponding to the computation result, to compare the second component of the authentication fingerprint corresponding to the computation result with a second component of a second authentication fingerprint for authentication. Therefore, an amount of computation is large and verification efficiency is low.

SUMMARY

Embodiments of the present disclosure provide a method, an apparatus, and a system for authenticating a fully homomorphic message, to effectively reduce an amount of computation in a verification process and improve efficiency of verifying a computation result of a server.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
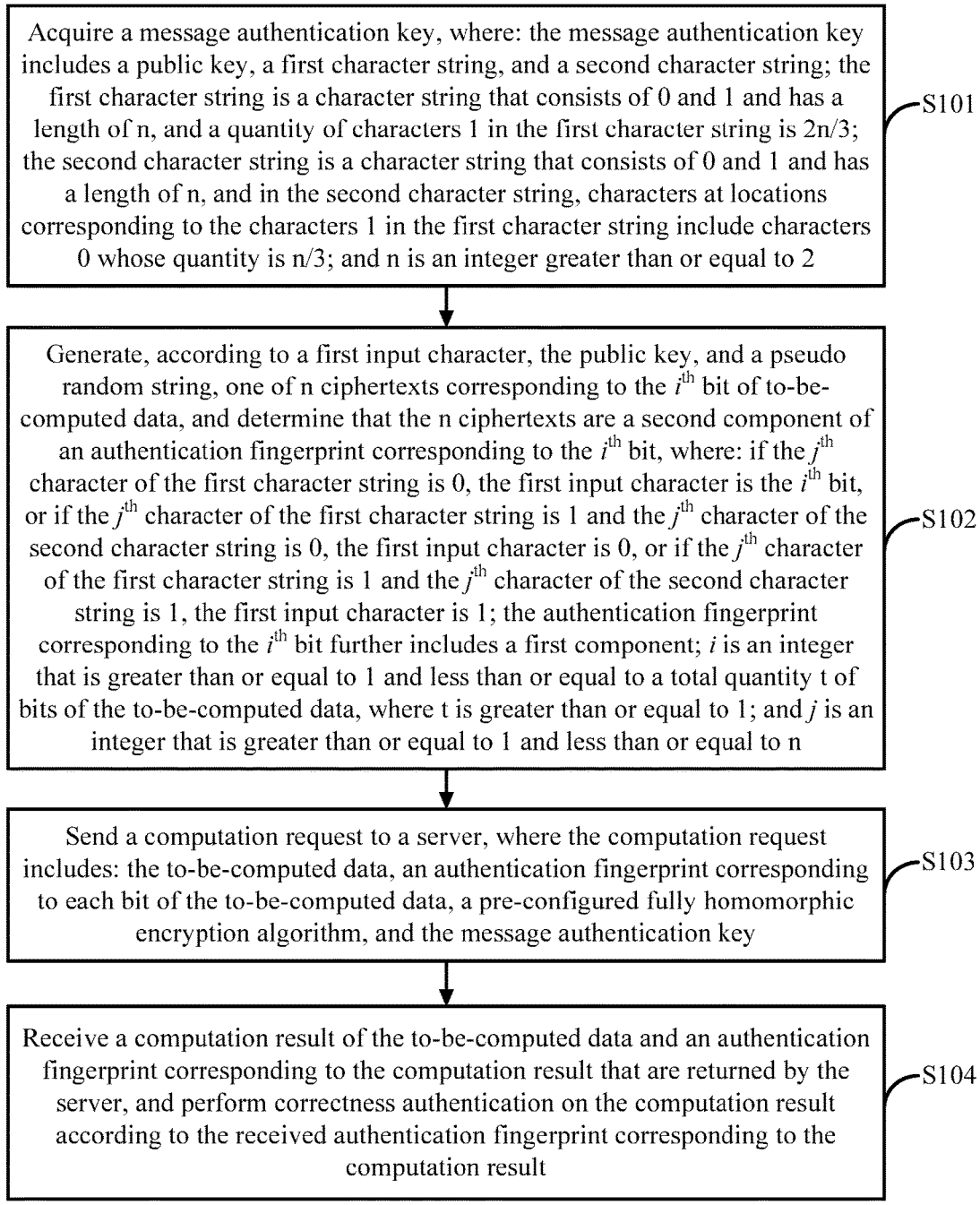
FIG. 1 is a flowchart of a method for authenticating a fully homomorphic message according to an embodiment of the present disclosure.

FIG. 1 is a flowchart of a method for authenticating a fully homomorphic message according to an embodiment of the present disclosure. This embodiment of the present disclosure provides a method for authenticating a fully homomorphic message that is mainly used in a distributed environment, for example, a cloud computing environment. That is, a terminal needs a server to compute specified to-be-computed data according to a computation function to acquire a computation result, and the server returns the computation result to the terminal. However, there is no trust relationship between the server and the terminal, or the server is objectively malicious, or attacked by a hacker, so that the computation result is not what is required by the terminal. Therefore, the terminal needs to perform correctness verification on the computation result returned by the server. This embodiment mainly provides a technical solution of a method for authenticating a fully homomorphic message on a terminal side in the foregoing process. As shown in FIG. 1, specific steps are as follows:

S101: Acquire a message authentication key, where: the message authentication key includes a public key, a first character string, and a second character string; the first character string is a character string that consists of 0 and 1 and has a length of n, and a quantity of characters 1 in the first character string is 2n/3; the second character string is a character string that consists of 0 and 1 and has a length of n, and in the second character string, characters at locations corresponding to the characters 1 in the first character string include characters 0 whose quantity is n/3; and n is an integer greater than or equal to 2.

In this embodiment, the terminal determines a random security parameter n, where n is an integer greater than or equal to 2, that is, the lengths of the first character string and the second character string; and then selects the first character string and the second character string whose lengths are both n, where characters in both the first character string and the second character string are 0 or 1, the first character string includes 2n/3 1 and characters 0 whose quantity is n/3, and in the second character string, there are characters 0 whose quantity is n/3 and n/3 1 separately at 2n/3 locations corresponding to the locations of the is in the first character string. For example, n is 9, that is, the lengths of the first character string and the second character string are both 9, the first character string is {010111011}, including six is, and the second character string may be {100101010}. It should be noted that, in this example, in a case in which the first character string is determined, the second character string does not have only one form, the foregoing is merely an example, and the second character string is acceptable provided that the foregoing condition is met. That is, in the second character string, a half of locations corresponding to the characters 1 in the first character string are 0s, and the other half of the locations are 1s.

S102: Generate, according to a first input character, the public key, and a pseudo random string, one of n ciphertexts corresponding to the $i^{th}$ bit of to-be-computed data, and determine that the n ciphertexts are a second component of an authentication fingerprint corresponding to the $i^{th}$ bit, where: if the $j^{th}$ character of the first character string is 0, the first input character is the $i^{th}$ bit, or if the $j^{th}$ character of the first character string is 1 and the $j^{th}$ character of the second character string is 0, the first input character is 0, or if the $j^{th}$ character of the first character string is 1 and the $j^{th}$ character of the second character string is 1, the first input character is 1; the authentication fingerprint corresponding to the $i^{th}$ bit further includes a first component; i is an integer that is greater than or equal to 1 and less than or equal to a total quantity t of bits of the to-be-computed data, where t is greater than or equal to 1; and j is an integer that is greater than or equal to 1 and less than or equal to n.

In this embodiment, an authentication fingerprint corresponding to each bit of the to-be-computed data is generated according to the message authentication key, where the to-be-computed data includes information of at least one bit, and for each bit of the to-be-computed data, a corresponding authentication fingerprint is generated according to the message authentication key.

S103: Send a computation request to a server, where the computation request includes: the to-be-computed data, the authentication fingerprint corresponding to each bit of the to-be-computed data, a pre-configured fully homomorphic encryption algorithm, and the message authentication key.

In this embodiment, if the to-be-computed data has t bits, the computation request sent to the server includes t authentication fingerprints corresponding to the t bits of the to-be-computed data. The fully homomorphic encryption algorithm includes an algorithm for generating a public key, a private key, and a computation key, an encryption algorithm, a decryption algorithm, and a ciphertext computation function, and is mainly applied in an operation process of computing the authentication fingerprint corresponding to each bit and verifying the computation result obtained by the server. The fully homomorphic encryption algorithm is an existing algorithm, and details are not described herein again.

S104: Receive a computation result of the to-be-computed data and an authentication fingerprint corresponding to the computation result that are returned by the server, and perform correctness authentication on the computation result according to the received authentication fingerprint corresponding to the computation result.

In this embodiment, the terminal receives the computation result and the authentication fingerprint corresponding to the computation result that are returned by the server, where the computation result is acquired by computing the to-be-computed data; verifies, by using the authentication fingerprint corresponding to the computation result, whether the computation result is correct; and if it is verified that the computation result is correct, receives the computation result, or if it is verified that the computation result is incorrect, discards the computation result.

According to the method for authenticating a fully homomorphic message provided in this embodiment, on a premise that a verification requirement is met, a message authentication key is acquired, where the message authentication key includes: a first character string that is a character string that consists of 0 and 1 and has a length of n, where a quantity of characters 1 in the first character string is 2n/3, and a second character string that is a character string that consists of 0 and 1 and has a length of n, where characters at locations corresponding to the characters 1 in the first character string include characters 0 whose quantity is n/3. An authentication fingerprint corresponding to each bit of to-be-computed data is generated according to the message authentication key; the to-be-computed data, the authentication fingerprint corresponding to each bit, a fully homomorphic encryption algorithm, and the message authentication key are sent to a server, so that the server obtains, by means of computation, a computation result of the to-be-computed data and an authentication fingerprint corresponding to the computation result, and returns the computation result and the authentication fingerprint corresponding to the computation result to a terminal; and the terminal performs correctness authentication on the computation result according to the received authentication fingerprint corresponding to the computation result. The first character string that consists of 0 and 1 and has a length of n and the second character string that consists of 0 and 1 and has a length of n are selected, where the quantity of the is in the first character string is 2n/3, and in the second character string, the characters at the locations corresponding to the characters 1 in the first character string include characters 0 whose quantity is n/3, which resolves a problem in the prior art that a process of calculating a random number except 1 or 0 in a process of computing an authentication fingerprint corresponding to each bit is complex because a first character string is a subset of a randomly-generated set {1, 2, ..., n−1, n} and has a length of n/2. Therefore, complexity of an algorithm of the terminal and an amount of computation are effectively reduced.

Figure 2:
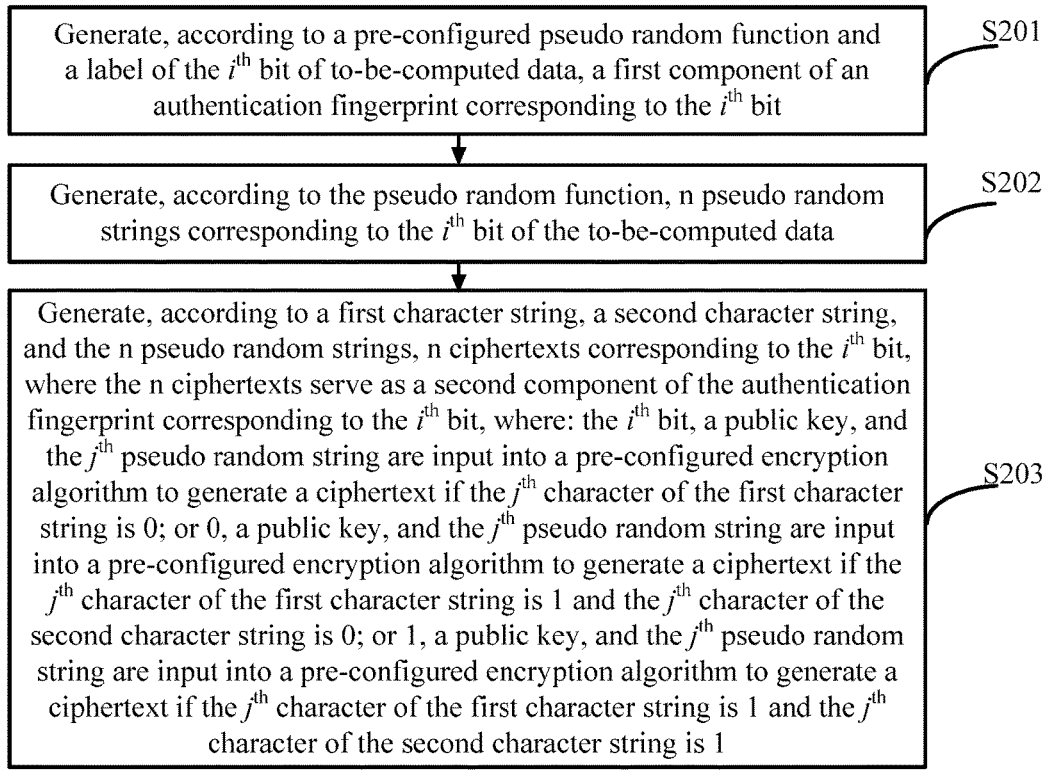
FIG. 2 is a flowchart of a method for authenticating a fully homomorphic message according to an embodiment of the present disclosure.

Further, FIG. 2 is a flowchart of a method for authenticating a fully homomorphic message according an embodiment of the present disclosure. On the basis of the embodiment shown in FIG. 1, the message authentication key further includes a public key pk, a private key sk', a computation key evk', a pre-configured secure hash function, and a pre-configured pseudo random function, and the authentication fingerprint corresponding to the $i^{th}$ bit is generated by executing the following steps:

S201: Generate, according to the pre-configured pseudo random function and a label of the $i^{th}$ bit of the to-be-computed data, the first component of the authentication fingerprint corresponding to the $i^{th}$ bit.

In this embodiment, the to-be-computed data has a total of t bits, and the pre-configured pseudo random function may be a single function (or may be a family of functions). For example, the pseudo random function is $f_k$, the first component of the authentication fingerprint of the $i^{th}$ bit is $v_i$, and the label $\tau$ of the $i^{th}$ bit is input into the pseudo random function for calculation to acquire the first component of the authentication fingerprint of the $i^{th}$ bit, that is, $v_i = f_k(\tau)$.

In addition, in this embodiment of the present disclosure, each bit of the to-be-computed data has a specified label, and the label is an identifier of each bit, is similar to a serial number, and is used to mark a location of the bit in to-be-computed data.

S202: Generate, according to the pseudo random function, n pseudo random strings corresponding to the $i^{th}$ bit of the to-be-computed data.

In this embodiment, for example, i and the label $\tau$ of the $i^{th}$ bit are input into the foregoing pseudo random function to generate the n pseudo random strings, that is, $rand_j = f_k(\tau, i)$, where the n pseudo random strings may be expressed as $rand_1, rand_2, \ldots, rand_n$, and are used in a subsequent process of computing the second component of the authentication fingerprint of the $i^{th}$ bit.

S203: Generate, according to the first character string, the second character string, and the n pseudo random strings, the n ciphertexts corresponding to the $i^{th}$ bit, where the n ciphertexts serve as the second component of the authentication fingerprint corresponding to the $i^{th}$ bit, where: the $i^{th}$ bit, the public key, and the $j^{th}$ pseudo random string are input into the pre-configured encryption algorithm to generate a ciphertext if the $j^{th}$ character of the first character string is 0; or 0, the public key, and the $j^{th}$ pseudo random string are input into the pre-configured encryption algorithm to generate a ciphertext if the $j^{th}$ character of the first character string is 1 and $j^{th}$ character of the second character string is 0; or 1, the public key, and the $j^{th}$ pseudo random string are input into the pre-configured encryption algorithm to generate a ciphertext if the $j^{th}$ character of the first character string is 1 and the $j^{th}$ character of the second character string is 1.

In this embodiment, the pre-configured encryption algorithm is an encryption algorithm (HE.Enc) in the fully homomorphic encryption algorithm; i is an integer that is greater than or equal to 1 and less than or equal to the total quantity t of the bits of the to-be-computed data; j is an integer that is greater than or equal to 1 and less than or equal to n. For the $i^{th}$ bit, a manner of acquiring the second component of the authentication fingerprint corresponding to the $i^{th}$ bit is described in detail:

The $i^{th}$ bit, the public key, and the $j^{th}$ pseudo random string are input into the pre-configured encryption algorithm to generate the ciphertext $c_j$ if the $j^{th}$ character of the first character string is 0, that is, $c_j = HE.Enc(b_i, pk, rand_j)$, where $b_i$ is used to represent the $i^{th}$ bit.

0, the public key, and the $j^{th}$ pseudo random string are input into the pre-configured encryption algorithm to generate the ciphertext $c_j$ if the $j^{th}$ character of the first character string is 1 and $j^{th}$ character of the second character string is 0, that is, $c_j$=HE.Enc(0, pk,$rand_j$).

1, the public key, and the pseudo random string are input into the pre-configured encryption algorithm to generate the ciphertext $c_j$ if the $j^{th}$ character of the first character string is 1 and $j^{th}$ character of the second character string is 1, that is, $c_j$=HE.Enc (1, pk, $rand_j$).

The first character string is determined by means of traversing in the foregoing manner, the n ciphertexts are acquired as the second component of the authentication fingerprint corresponding to the $i^{th}$ bit. $c_j$=HE.Enc($b_i$, pk,$rand_j$) represents an encryption ciphertext corresponding to $b_i$ in the pseudo random string $rand_i$. For example, $c_j$=HE.Enc(1, pk,$rand_j$) represents an encryption ciphertext corresponding to 1 in the pseudo random string $rand_i$.

The authentication fingerprint corresponding to the $i^{th}$ bit includes the second component of the authentication fingerprint of the $i^{th}$ bit and the first component of the authentication fingerprint of the $i^{th}$ bit. The authentication fingerprint corresponding to the $i^{th}$ bit may be represented as $\theta_i=(c_1, \ldots c_n, v_i)$.

According to the method for authenticating a fully homomorphic message provided in this embodiment, a message authentication key is acquired, where the message authentication key includes: a first character string that is a character string that consists of 0 and 1 and has a length of n, where a quantity of characters 1 in the first character string is 2n/3, and a second character string that is a character string that consists of 0 and 1 and has a length of n, where characters at locations corresponding to the characters 1 in the first character string include characters 0 whose quantity is n/3. In a process of generating, according to the message authentication key, an authentication fingerprint corresponding to each bit of to-be-computed data, a random ciphertext including 2 characters 0 whose quantity is n/3 and 1 is inserted into a second component of the authentication fingerprint corresponding to each bit; the to-be-computed data, the authentication fingerprint corresponding to each bit, a fully homomorphic encryption algorithm, and the message authentication key are sent to a server, so that the server obtains, by means of computation, a computation result of the to-be-computed data and an authentication fingerprint corresponding to the computation result, and returns the computation result and the authentication fingerprint corresponding to the computation result to a terminal; and the terminal performs correctness authentication on the computation result according to the received authentication fingerprint corresponding to the computation result. The first character string that has a length of n and in which the quantity of the 1s is 2n/3 and the second character string that has a length of n and in which the characters at the locations corresponding to the characters 1 in the first character string include characters 0 whose quantity is n/3 are selected, which resolves a problem in the prior art that a process of calculating a random number except 1 or 0 in a process of computing an authentication fingerprint corresponding to each bit is complex because a first character string is a subset of a randomly-generated set $\{1, 2, \ldots, n-1, n\}$ and has a length of n/2. Therefore, complexity of an algorithm of the terminal and an amount of computation are effectively reduced, and efficiency of verifying the computation result is improved.

Figure 3:
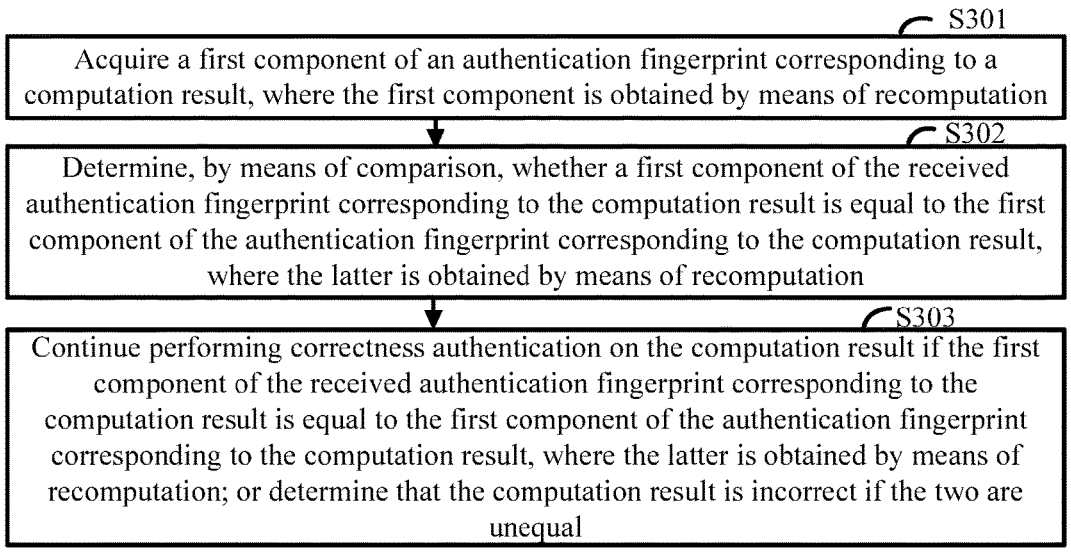
FIG. 3 is a flowchart of a method for authenticating a fully homomorphic message according to an embodiment of the present disclosure.

FIG. 3 is a flowchart of a method for authenticating a fully homomorphic message according to an embodiment of the present disclosure. As shown in FIG. 3, on the basis of the foregoing an embodiment and an embodiment, steps for specifically implementing S104 are as follows:

S301: Acquire a first component of the authentication fingerprint corresponding to the computation result, where the first component is obtained by means of recomputation.

In this embodiment, the terminal receives the computation result and the authentication fingerprint corresponding to the computation result that are returned by the server. To verify a first component of the authentication fingerprint corresponding to the computation result, the terminal first needs to acquire the first component of the authentication fingerprint corresponding to the computation result, where the first component is obtained by means of recomputation. Two specific acquiring manners are as follows:

The first acquiring manner is that: a computation function used to compute the to-be-computed data is pre-configured on the terminal, and the terminal acquires, according to acquired first components of the t authentication fingerprints corresponding to the t bits of the to-be-computed data and by using the computation function used to compute the to-be-computed data, the first component of the authentication fingerprint corresponding to the computation result, where the first component is obtained by means of recomputation, where the computation function used to compute the to-be-computed data is a hash tree, where the hash tree includes t inputs and one output, and each node in the hash tree is a pre-configured secure hash function.

The second acquiring manner is that: a computation function used to compute the to-be-computed data is not configured on the terminal, but a third-party device is introduced for computation, and a computation function used to compute the to-be-computed data is configured on the third-party device; the terminal sends first components of the t authentication fingerprints corresponding to the t bits of the to-be-computed data to the third-party device, so that the third-party device acquires, according to the received first components of the t authentication fingerprints corresponding to the t bits of the to-be-computed data and by using the pre-configured computation function used to compute the to-be-computed data, the first component of the authentication fingerprint corresponding to the computation result, where the first component is obtained by means of recomputation; and the terminal receives the first component of the authentication fingerprint corresponding to the computation result, where the first component is obtained by means of recomputation and returned by the third-party device, where the computation function used to compute the to-be-computed data is a hash tree, the hash tree includes t inputs and one output, and each node in the hash tree is the secure hash function.

The third-party device is a semi-trusted third-party (for example, the health authorities) user equipment that does not need to know the computation function used to compute the to-be-computed data, and the third-party device does not know the to-be-computed data of the terminal either, which protects privacy of the user equipment.

S302: Determine, by means of comparison, whether a first component of the received authentication fingerprint corresponding to the computation result is equal to the first component of the authentication fingerprint corresponding to the computation result, where the latter is obtained by means of recomputation.

S303: Continue performing correctness authentication on the computation result if the first component of the received authentication fingerprint corresponding to the computation result is equal to the first component of the authentication fingerprint corresponding to the computation result, where the latter is obtained by means of recomputation; or determine that the computation result is incorrect if the two are unequal.

According to the method for authenticating a fully homomorphic message provided in this embodiment, a message authentication key is acquired, where the message authentication key includes: a first character string that is a character string that consists of 0 and 1 and has a length of n, where a quantity of characters 1 in the first character string is 2n/3, and a second character string that is a character string that consists of 0 and 1 and has a length of n, where characters at locations corresponding to the characters 1 in the first character string include characters 0 whose quantity is n/3.

In a process of generating, according to the message authentication key, an authentication fingerprint corresponding to each bit of to-be-computed data, a random ciphertext including 2 characters 0 whose quantity is n/3 and 1 is inserted into a second component of the authentication fingerprint corresponding to each bit; the to-be-computed data, the authentication fingerprint corresponding to each bit, a fully homomorphic encryption algorithm, and the message authentication key are sent to a server, so that the server obtains, by means of computation, a computation result of the to-be-computed data and an authentication fingerprint corresponding to the computation result, and returns the computation result and the authentication fingerprint corresponding to the computation result to a terminal; and the terminal acquires an authentication fingerprint corresponding to the computation result that is obtained by means of recomputation, to perform correctness authentication on the computation result.

If a computation function used to compute the to-be-computed data is configured on the terminal, the terminal acquires, by means of computation, a first component of the authentication fingerprint corresponding to the computation result; or if a computation function used to compute the to-be-computed data is not configured on the terminal, the terminal sends the computation result to a third-party device, so that the third-party device performs computation and returns a first component of the authentication fingerprint corresponding to the computation result, where the first component is obtained by means of recomputation; and the terminal compares the first component with a first component of the received authentication fingerprint corresponding to the computation result that is sent by the server, to verify correctness of the computation result, and if the computation result is correct, the terminal performs further verification. The first character string that has a length of n and in which the quantity of the 1s is 2n/3 and the second character string that has a length of n and in which the characters at the locations corresponding to the characters 1 in the first character string include characters 0 whose quantity is n/3 are selected, which resolves a problem in the prior art that a process of calculating a random number except 1 or 0 in a process of computing an authentication fingerprint corresponding to each bit is complex because a first character string is a subset of a randomly-generated set $\{1, 2, \ldots, n-1, n\}$ and has a length of n/2. Using the third-party device to compute the first component of the authentication fingerprint corresponding to the computation result further avoids inconvenience caused by that the terminal does not know the computation function used to compute the to-be-computed data in a case in which the computation function used to compute the to-be-computed data is a business secret. Therefore, privacy of the terminal is protected, complexity of an algorithm of the terminal and an amount of computation are effectively reduced, and efficiency of verifying the computation result is improved.

Figure 4:
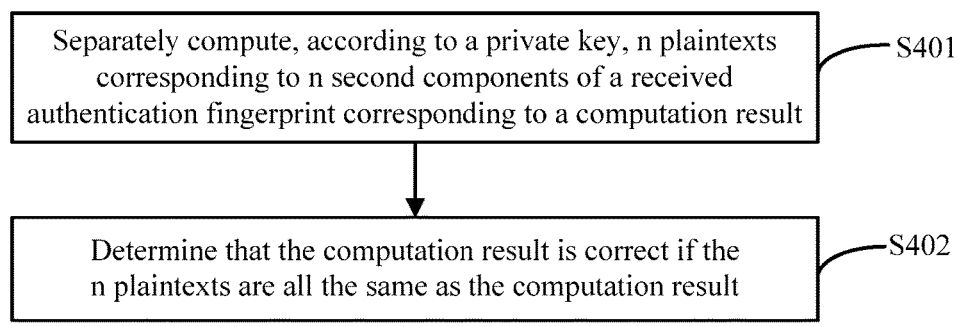
FIG. 4 is a flowchart of a method for authenticating a fully homomorphic message according to an embodiment of the present disclosure.

FIG. 4 is a flowchart of a method for authenticating a fully homomorphic message according to an embodiment of the present disclosure. As shown in FIG. 4, on the basis of the foregoing embodiment shown in FIG. 3, the message authentication key further includes a private key, and a specific implementation manner of the continuing performing correctness authentication on the computation result if the first component of the received authentication fingerprint corresponding to the computation result is equal to the first component of the authentication fingerprint corresponding to the computation result, where the latter is obtained by means of recomputation is as follows:

S401: Separately compute, according to the private key, n plaintexts corresponding to n second components of the received authentication fingerprint corresponding to the computation result.

In this embodiment, the terminal performs, according to the private key, decryption computation on each second component of the received authentication fingerprint corresponding to the computation result that is sent by the server, to acquire the n corresponding plaintexts, which are used to be compared with the computation result for determining.

For example, the computation result sent by the server is e, the authentication fingerprint corresponding to the computation result is $(c_1^*, \ldots c_n^*, V^*)$ and the second component of the authentication fingerprint corresponding to the computation result are $c_1^*, \ldots c_n^*$; $c_1^*, \ldots c_n^*$ is decrypted and computed according to the private key sk' and by invoking a formula $e_j=\text{HE.DEC}(sk',c_j^*)$ to acquire a corresponding plaintext $e_j$, and acquire all the plaintexts $e_1, \ldots, e_n$.

S402: Determine that the computation result is correct if the n plaintexts are all the same as the computation result.

In this embodiment, whether the foregoing n plaintexts are equal to the foregoing computation result is determined from 1 to n one by one. If there is one plaintext that is different from the computation result, the computation result is considered incorrect, and the correctness verification operation ends. Specifically, authentication may be performed in the following manner:

If the $j^{th}$ character of the first character string is 0, whether the computation result is equal to the $j^{th}$ plaintext is determined; if the computation result is unequal to the $j^{th}$ plaintext, it is determined that the computation result is incorrect, the computation result is discarded, and the correctness verification operation ends.

If the $j^{th}$ character of the first character string is 1, and the $j^{th}$ character of the second character string is 1, whether the computation result is equal to the $j^{th}$ plaintext is determined. If it is verified that there is one plaintext that is unequal to the computation result, it is determined that the computation result is incorrect, the computation result is discarded, and the correctness verification operation ends.

If the $j^{th}$ character of the first character string is 1, and the $j^{th}$ character of the second character string is 0, whether the computation result is equal to the $j^{th}$ plaintext is determined. If it is verified that there is one plaintext that is unequal to the computation result, it is determined that the computation result is incorrect, the computation result is discarded, and the correctness verification operation ends.

The foregoing three steps are a specific operation manner in one verification process for different characters in the first character string and the second character string. Each time it is verified that a plaintext is the same as the computation result, j increases by 1, and authentication is continued according to characters in the first character string and the second character string, where j is an integer that is greater than or equal to 1 and less than or equal to n, and n is a positive integer greater than or equal to 2, that is, determined lengths of the first character string and the second character string.

For example, the foregoing computation result e is verified according to the plaintexts $e_1, \ldots, e_n$ acquired by means of decryption and computation. If the computation result e is not discarded in an entire verification process with reference to the foregoing other embodiments, the computation result e is accepted, and the terminal considers the computation result returned by the server correct.

According to the method for authenticating a fully homomorphic message provided in this embodiment, a message authentication key is acquired, where the message authentication key includes: a first character string that is a character string that consists of 0 and 1 and has a length of n, where a quantity of characters 1 in the first character string is 2n/3, and a second character string that is a character string that consists of 0 and 1 and has a length of n, where characters at locations corresponding to the characters 1 in the first character string include characters 0 whose quantity is n/3. In a process of generating, according to the message authentication key, an authentication fingerprint corresponding to each bit of to-be-computed data, a random ciphertext including 2 characters 0 whose quantity is n/3 and 1 is inserted into a second component of the authentication fingerprint corresponding to each bit; the to-be-computed data, the authentication fingerprint corresponding to each bit, a fully homomorphic encryption algorithm, and the message authentication key are sent to a server, so that the server obtains, by means of computation, a computation result of the to-be-computed data and an authentication fingerprint corresponding to the computation result, and returns the computation result and the authentication fingerprint corresponding to the computation result to a terminal; and the terminal acquires an authentication fingerprint corresponding to the computation result that is obtained by means of recomputation, to perform correctness authentication on the computation result. Specifically, if a computation function used to compute the to-be-computed data is configured on the terminal, the terminal itself acquires, by means of computation, a first component of the authentication fingerprint corresponding to the computation result; or if a computation function used to compute the to-be-computed data is not configured on the terminal, the terminal sends the computation result to a third-party device, so that the third-party device performs computation and returns a first component of the authentication fingerprint corresponding to the computation result, where the first component is obtained by means of recomputation; and the terminal compares the first component with a first component of the received authentication fingerprint corresponding to the computation result that is sent by the server, to verify correctness of the computation result, and if the computation result is correct, the terminal performs further verification. A private key is invoked to decrypt and compute a second component of the authentication fingerprint corresponding to the computation result that is sent by the server to acquire t plaintexts, and the t plaintexts are compared with the computation result to verify correctness of the computation result. The first character string that has a length of n and in which the quantity of the 1s is 2n/3 and the second character string that has a length of n and in which the characters at the locations corresponding to the characters 1 in the first character string include characters 0 whose quantity is n/3 are selected, which resolves a problem in the prior art that a process of calculating a random number except 1 or 0 in a process of computing an authentication fingerprint corresponding to each bit is complex because a first character string is a subset of a randomly-generated set $\{1, 2, \ldots, n-1, n\}$ and has a length of n/2; further avoids inconvenience caused by that the terminal does not know the computation function used to compute the to-be-computed data in a case in which the computation function used to compute the to-be-computed data is a business secret, and therefore, privacy of the terminal is protected. In addition, after the authentication fingerprint corresponding to the computation result that is returned by the server is received, only a total of n times of decryption and computation are needed. Compared with the prior art in which n/2 times of operations are further performed on each bit and a total of t*(n/2) times of operations are needed to acquire, by means of recomputation, the second component of the authentication fingerprint corresponding to the computation result, the technical solution in this embodiment effectively reduces complexity of an algorithm and an amount of computation during verification by the terminal, and improves efficiency of verifying the computation result.

Figure 5:
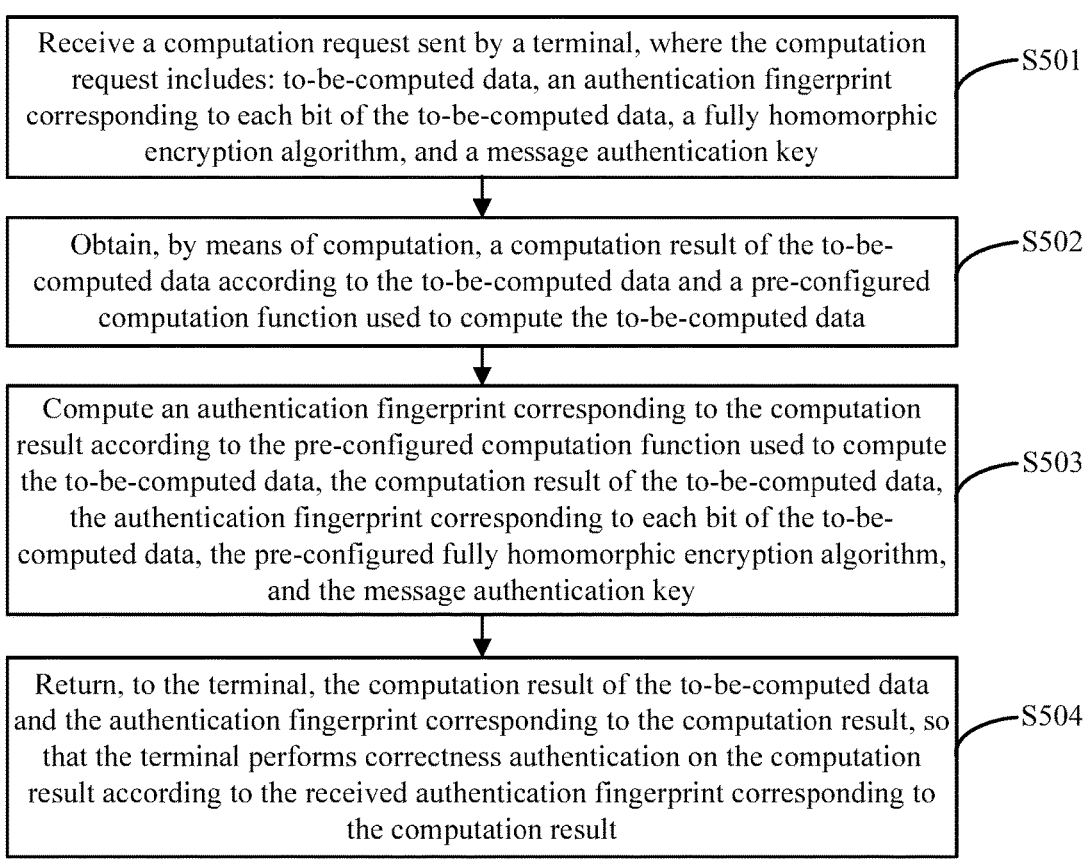
FIG. 5 is a flowchart of a method for authenticating a fully homomorphic message according to an embodiment of the present disclosure.

FIG. 5 is a flowchart of a method for authenticating a fully homomorphic message according to an embodiment of the present disclosure. As shown in FIG. 5, this embodiment provides a technical solution of a method for authenticating a fully homomorphic message on a server side, and specific steps are as follows:

S501: Receive a computation request sent by a terminal, where the computation request includes: to-be-computed data, an authentication fingerprint corresponding to each bit of the to-be-computed data, a fully homomorphic encryption algorithm, and a message authentication key.

S502: Obtain, by means of computation, a computation result of the to-be-computed data according to the to-be-computed data and a pre-configured computation function used to compute the to-be-computed data.

S503: Compute an authentication fingerprint corresponding to the computation result according to the pre-configured computation function used to compute the to-be-computed data, the computation result of the to-be-computed data, the authentication fingerprint corresponding to each bit of the to-be-computed data, the pre-configured fully homomorphic encryption algorithm, and the message authentication key.

S504: Return, to the terminal, the computation result of the to-be-computed data and the authentication fingerprint corresponding to the computation result, so that the terminal performs correctness authentication on the computation result according to the received authentication fingerprint corresponding to the computation result.

In this embodiment, the computation function used to compute the to-be-computed data is pre-configured on the server, so that the to-be-computed data sent by the terminal is computed to acquire the computation result. The server does not need to return original to-be-computed data to the terminal, but adds a corresponding authentication fingerprint to the computation result, so that the terminal verifies the computation result according to the authentication fingerprint corresponding to the computation result, and acquires a correct computation result without knowing the original to-be-computed data.

According to the method for authenticating a fully homomorphic message provided in this embodiment, a computation request sent by a terminal is received, where the computation request includes a message authentication key;

a server obtains, by means of computation, a computation result of to-be-computed data according to a pre-configured computation function used to compute the to-be-computed data, acquires, by means of computation, an authentication fingerprint corresponding to the computation result according to the message authentication key, the computation result, and an authentication fingerprint corresponding to each bit of the to-be-computed data, and returns the authentication fingerprint corresponding to the computation result to the terminal, so that the terminal performs correctness authentication on the computation result according to the received authentication fingerprint corresponding to the computation result, which resolves a problem in the prior art that a process of calculating a random number except 1 or 0 in a process of computing an authentication fingerprint corresponding to each bit is complex because a first character string of a message authentication key generated by a terminal is a subset of a randomly-generated set $\{1, 2, \ldots, n-1, n\}$ and has a length of $n/2$. Therefore, an amount of computation in a process of verification by the terminal is effectively reduced, and efficiency of verifying the computation result obtained by the server by the terminal is improved.

Figure 6:
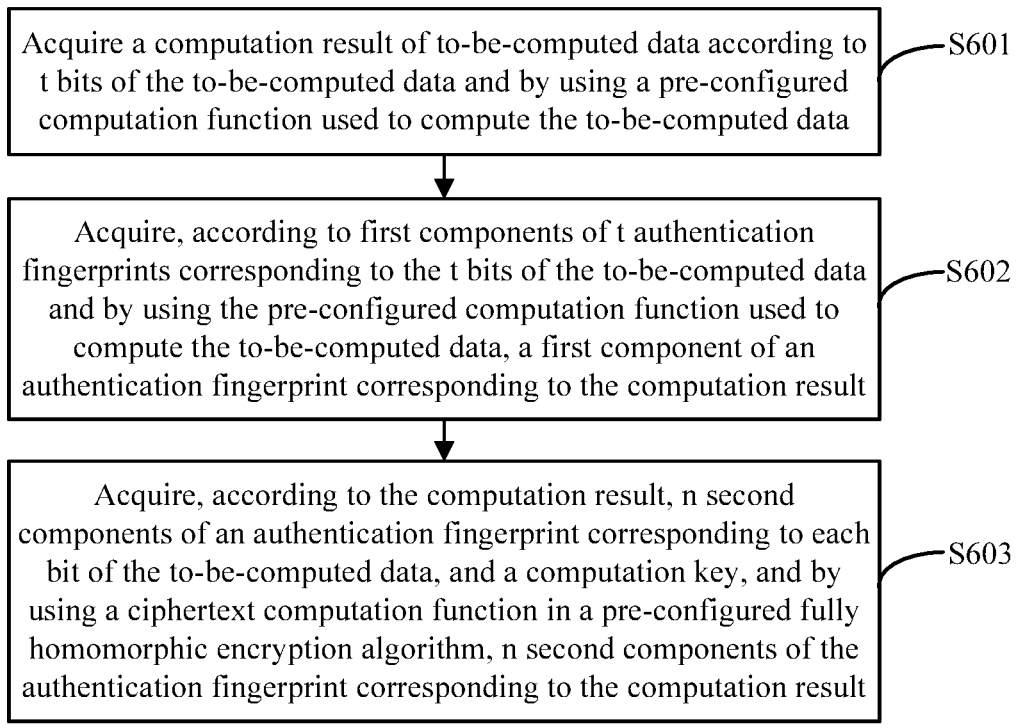
FIG. 6 is a flowchart of a method for authenticating a fully homomorphic message according to an embodiment of the present disclosure.

FIG. 6 is a flowchart of a method for authenticating a fully homomorphic message according to an embodiment of the present disclosure. As shown in FIG. 6, on the basis of the foregoing Embodiment, steps for specifically implementing S502 and S503 are as follows:

S601: Acquire the computation result of the to-be-computed data according to t bits of the to-be-computed data and by using the pre-configured computation function used to compute the to-be-computed data.

In this embodiment, the computation result of the to-be-computed data is acquired first. The computation function used to compute the to-be-computed data is a hash tree, where: the hash tree includes t inputs and one output, and each node in the hash tree is a pre-configured secure hash function; and t is a total quantity of bits of the to-be-computed data.

S602: Acquire, according to first components of t authentication fingerprints corresponding to the t bits of the to-be-computed data and by using the pre-configured computation function used to compute the to-be-computed data, a first component of the authentication fingerprint corresponding to the computation result.

In this embodiment, the authentication fingerprint corresponding to each bit of the to-be-computed data includes a first component and a second component. For the t bits of the to-be-computed data, there is a total of t corresponding authentication fingerprints, each authentication fingerprint includes one first component and n second components, and the message authentication key includes a computation key.

S603: Acquire, according to the computation result, n second components of the authentication fingerprint corresponding to each bit of the to-be-computed data, and the computation key, and by using a ciphertext computation function in the pre-configured fully homomorphic encryption algorithm, n second components of the authentication fingerprint corresponding to the computation result.

In this embodiment, the authentication fingerprint corresponding to the computation result includes the first component of the authentication fingerprint corresponding to the computation result and the n second components of the authentication fingerprint corresponding to the computation result. The server obtains, by means of computation, the computation result of the to-be-computed data and the authentication fingerprint corresponding to the computation result; and sends the computation result and the authentication fingerprint corresponding to the computation result to the terminal, so that the terminal verifies correctness of the computation result according to the authentication fingerprint corresponding to the computation result, and acquires a correct computation result.

According to the method for authenticating a fully homomorphic message provided in this embodiment, a computation request sent by a terminal is received, where the computation request includes a message authentication key, which includes a computation key; a server obtains, by means of computation, a computation result of to-be-computed data according to a pre-configured computation function used to compute the to-be-computed data, acquires, by means of computation according to the message authentication key, the computation result, and an authentication fingerprint corresponding to each bit of the to-be-computed data, a first component and a second component of an authentication fingerprint corresponding to the computation result, and returns the first component and the second component of the authentication fingerprint corresponding to the computation result to the terminal, so that the terminal performs correctness authentication on the computation result according to the received authentication fingerprint corresponding to the computation result, which resolves a problem in the prior art that a process of calculating a random number except 1 or 0 in a process of computing an authentication fingerprint corresponding to each bit is complex because a first character string of a message authentication key generated by a terminal is a subset of a randomly-generated set $\{1, 2, \ldots, n-1, n\}$ and has a length of $n/2$. Therefore, an amount of computation in a process of verification by the terminal is effectively reduced, and efficiency of verifying the computation result obtained by the server by the terminal is improved.

Figure 7:
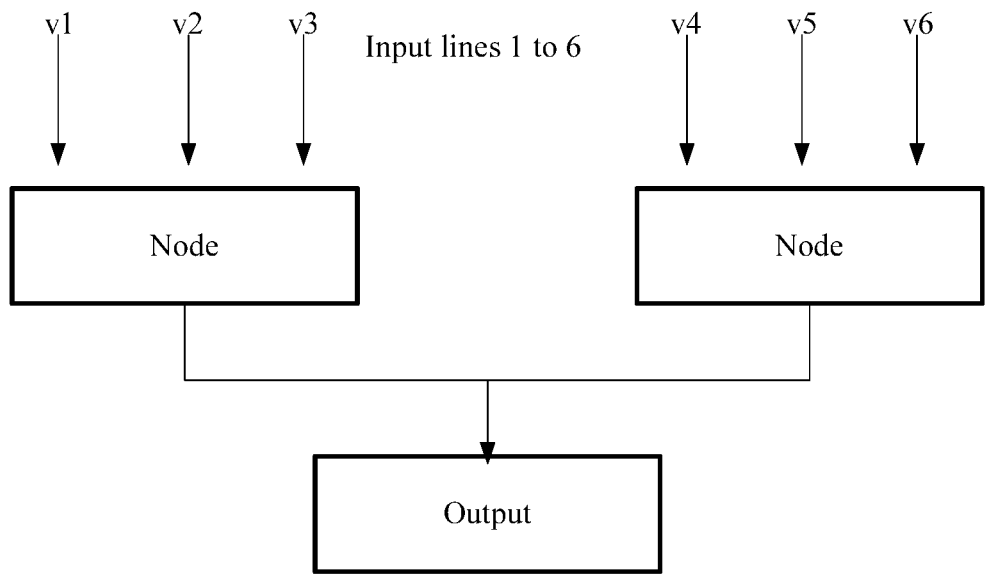
FIG. 7 is a schematic diagram of an instance of a computation function used to compute to-be-computed data according to the present disclosure.

FIG. 7 is a schematic diagram of an instance of a computation function used to compute to-be-computed data according to the present disclosure. As shown in FIG. 7, in the technical solutions shown in FIG. 1 to FIG. 6, the computation function used to compute the to-be-computed data is a hash tree, where the hash tree includes t inputs and one output, and each node in the hash tree is a pre-configured secure hash function. The following uses examples to illustrate an application of the computation function, and g may be used to represent the computation function used to compute the to-be-computed data.

In this embodiment, g may be expressed as $\{0,1\}^t \rightarrow \{0,1\}$, and is a circuit. The secure hash function H is $\{0,1\}^* \rightarrow \{0,1\}^m$, the hash tree $g^H$ is expressed as $\{\{0,1\}^*\}^t \rightarrow \{0,1\}^m$. As shown in FIG. 7, a total quantity of bits of the to-be-computed data is 6, and each node is a secure hash function H, which may be an addition gate or multiplication gate circuit. When acquiring the computation result of the to-be-computed data, the server inputs each bit of the to-be-computed data into a different input line, and an acquired final output result is the computation result e. When acquiring the first component of the authentication fingerprint corresponding to the computation result, the server uses the first component $v_i$ (i is greater than or equal to 1 and less than or equal to 6) of the authentication fingerprint corresponding to each bit of the to-be-computed data as an input of the input line to perform computation, and what is finally output is the first component of the authentication fingerprint corresponding to the computation result. When the terminal and the third-party device apply the computation function used to compute the to-be-computed data, a computation manner is the same as that used by the server.

Figure 8:
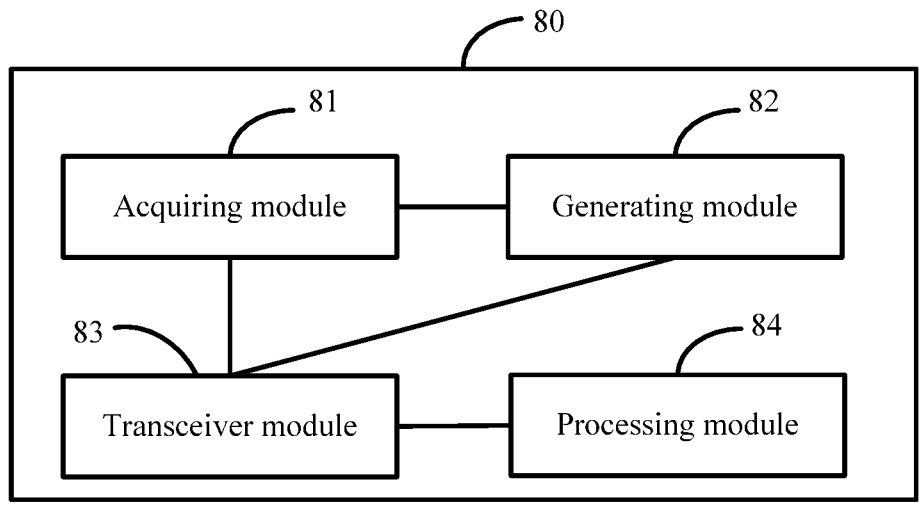
FIG. 8 is a schematic structural diagram of an apparatus for authenticating a fully homomorphic message according to an embodiment of the present disclosure.

FIG. 8 is a schematic structural diagram of an apparatus for authenticating a fully homomorphic message according to an embodiment of the present disclosure. As shown in FIG. 8, the apparatus for authenticating a fully homomorphic message 80 includes: an acquiring module 81, configured to acquire a message authentication key, where: the message authentication key includes a public key, a first character string, and a second character string; the first character string is a character string that consists of 0 and 1 and has a length of n, and a quantity of characters 1 in the first character string is 2n/3; the second character string is a character string that consists of 0 and 1 and has a length of n, and in the second character string, characters at locations corresponding to the characters 1 in the first character string include characters 0 whose quantity is n/3; and n is an integer greater than or equal to 2; a generating module 82, configured to: generate, according to a first input character, the public key, and a pseudo random string, one of n ciphertexts corresponding to the $i^{th}$ bit of to-be-computed data, and determine that the n ciphertexts are a second component of an authentication fingerprint corresponding to the $i^{th}$ bit, where: if the $j^{th}$ character of the first character string is 0, the first input character is the $i^{th}$ bit, or if the $j^{th}$ character of the first character string is 1 and the $j^{th}$ character of the second character string is 0, the first input character is 0, or if the $j^{th}$ character of the first character string is 1 and the $j^{th}$ character of the second character string is 1, the first input character is 1; the authentication fingerprint corresponding to the $i^{th}$ bit further includes a first component; i is an integer that is greater than or equal to 1 and less than or equal to a total quantity t of bits of the to-be-computed data, where t is greater than or equal to 1; and j is an integer that is greater than or equal to 1 and less than or equal to n; a transceiver module 83, configured to send a computation request to a server, where the computation request includes: the to-be-computed data, an authentication fingerprint corresponding to each bit of the to-be-computed data, a pre-configured fully homomorphic encryption algorithm, and the message authentication key, where the transceiver module 83 is further configured to receive a computation result of the to-be-computed data and an authentication fingerprint corresponding to the computation result that are returned by the server; and a processing module 84, configured to perform correctness authentication on the computation result according to the authentication fingerprint corresponding to the computation result that is received by the transceiver module 83.

According to the apparatus for authenticating a fully homomorphic message provided in this embodiment, an acquiring module acquires a message authentication key, where the message authentication key includes: a first character string that is a character string that consists of 0 and 1 and has a length of n, where a quantity of characters 1 in the first character string is 2n/3, and a second character string that is a character string that consists of 0 and 1 and has a length of n, where characters at locations corresponding to the characters 1 in the first character string include characters 0 whose quantity is n/3; a generating module generates, according to the message authentication key, an authentication fingerprint corresponding to each bit of to-be-computed data; a transceiver module sends the to-be-computed data, the authentication fingerprint corresponding to each bit, a fully homomorphic encryption algorithm, and the message authentication key to a server, so that the server obtains, by means of computation, a computation result of the to-be-computed data and an authentication fingerprint corresponding to the computation result, and returns the computation result and the authentication fingerprint corresponding to the computation result to a terminal; and a processing module performs correctness authentication on the computation result according to the received authentication fingerprint corresponding to the computation result. The first character string that consists of 0 and 1 and has a length of n and the second character string that consists of 0 and 1 and has a length of n are selected, where the quantity of the is in the first character string is 2n/3, and in the second character string, the characters at the locations corresponding to the characters 1 in the first character string include characters 0 whose quantity is n/3, which resolves a problem in the prior art that a process of calculating a random number except 1 or 0 in a process of computing an authentication fingerprint corresponding to each bit is complex because a first character string is a subset of a randomly-generated set {1, 2, . . . , n−1, n} and has a length of n/2. Therefore, complexity of an algorithm of the terminal and an amount of computation are effectively reduced.

In An embodiment of the apparatus for authenticating a fully homomorphic message according to the present disclosure, on the basis of the foregoing embodiment, the generating module 82 is specifically configured to generate, according to a pre-configured pseudo random function and a label of the $i^{th}$ bit of the to-be-computed data, the first component of the authentication fingerprint corresponding to the $i^{th}$ bit; generate, according to the pseudo random function, n pseudo random strings corresponding to the $i^{th}$ bit of the to-be-computed data; and generate, according to the first character string, the second character string, and the n pseudo random strings, the n ciphertexts corresponding to the $i^{th}$ bit, where the n ciphertexts serve as the second component of the authentication fingerprint corresponding to the $i^{th}$ bit, where: the $i^{th}$ bit, the public key, and $j^{th}$ pseudo random string are input into the pre-configured encryption algorithm to generate a ciphertext if the $j^{th}$ character of the first character string is 0; or 0, the public key, and the $j^{th}$ pseudo random string are input into the pre-configured encryption algorithm to generate a ciphertext if the $j^{th}$ character of the first character string is 1 and the $j^{th}$ character of the second character string is 0; or 1, the public key, and the $j^{th}$ pseudo random string are input into the pre-configured encryption algorithm to generate a ciphertext if the $j^{th}$ character of the first character string is 1 and $j^{th}$ character of the second character string is 1.

Further, the processing module 84 is specifically configured to: recompute a first component of the authentication fingerprint corresponding to the computation result; determine, by means of comparison, whether a first component of the received authentication fingerprint corresponding to the computation result is equal to the first component of the authentication fingerprint corresponding to the computation result, where the latter is obtained by means of recomputation; and continue performing correctness authentication on the computation result if the first component of the received authentication fingerprint corresponding to the computation result is equal to the first component of the authentication fingerprint corresponding to the computation result, where the latter is obtained by means of recomputation; or determine that the computation result is incorrect if the two are unequal.

Optionally, the processing module 84 is further configured to acquire, according to acquired first components of t authentication fingerprints corresponding to the t bits of the to-be-computed data and by using a computation function used to compute the to-be-computed data, the first component of the authentication fingerprint corresponding to the computation result, where the first component is obtained by means of recomputation, where the computation function used to compute the to-be-computed data is a hash tree, where the hash tree includes t inputs and one output, and each node in the hash tree is a pre-configured secure hash function.

Optionally, the transceiver module 83 may be further configured to: send first components of t authentication fingerprints corresponding to the t bits of the to-be-computed data to a third-party device, so that the third-party device acquires, according to the received first components of the t authentication fingerprints corresponding to the t bits of the to-be-computed data and by using a pre-configured computation function used to compute the to-be-computed data, the first component of the authentication fingerprint corresponding to the computation result, where the first component is obtained by means of recomputation; and receive the first component of the authentication fingerprint corresponding to the computation result, where the first component is obtained by means of recomputation and returned by the third-party device, and the computation function used to compute the to-be-computed data is a hash tree, where the hash tree includes t inputs and one output, and each node in the hash tree is the secure hash function.

Further, the message authentication key further includes a private key, and the processing module 84 is further configured to separately compute, according to the private key, n plaintexts corresponding to n second components of the received authentication fingerprint corresponding to the computation result; and determine that the computation result is correct if the n plaintexts are all the same as the computation result.

The apparatus for authenticating a fully homomorphic message provided in this embodiment is configured to execute the technical solutions of the method embodiments shown in FIG. 1 to FIG. 7. The implementation principle and technical effect of this embodiment are similar to those of the method embodiments, and details are not described herein again.

Figure 9:
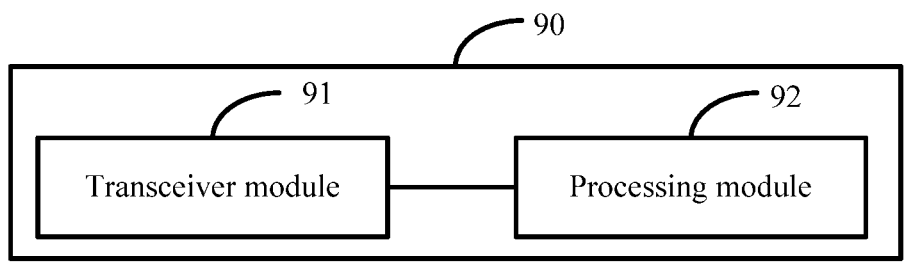
FIG. 9 is a schematic structural diagram of an apparatus for authenticating a fully homomorphic message according to an embodiment of the present disclosure.

FIG. 9 is a schematic structural diagram of an apparatus for authenticating a fully homomorphic message according to an embodiment of the present disclosure. As shown in FIG. 9, the apparatus for authenticating a fully homomorphic message 90 includes: a transceiver module 91, configured to receive a computation request sent by a terminal, where the computation request includes: to-be-computed data, an authentication fingerprint corresponding to each bit of the to-be-computed data, a fully homomorphic encryption algorithm, and a message authentication key; and a processing module 92, configured to obtain, by means of computation, a computation result of the to-be-computed data according to the to-be-computed data and a pre-configured computation function used to compute the to-be-computed data, where the processing module 92 is further configured to compute an authentication fingerprint corresponding to the computation result according to the pre-configured computation function used to compute the to-be-computed data, the computation result of the to-be-computed data, the authentication fingerprint corresponding to each bit of the to-be-computed data, the pre-configured fully homomorphic encryption algorithm, and the message authentication key; and the transceiver module 91 is further configured to return, to the terminal, the computation result of the to-be-computed data and the authentication fingerprint corresponding to the computation result, so that the terminal performs correctness authentication on the computation result according to the received authentication fingerprint corresponding to the computation result.

The apparatus for authenticating a fully homomorphic message provided in this embodiment is configured to execute the technical solutions of the method embodiments shown in FIG. 1 to FIG. 7. A receiving module receives a computation request sent by a terminal, where the computation request includes to-be-computed data and a message authentication key; a processing module obtains, by means of computation, a computation result of the to-be-computed data according to a pre-configured computation function used to compute the to-be-computed data, acquires, by means of computation, an authentication fingerprint corresponding to the computation result according to the message authentication key, the computation result, and an authentication fingerprint corresponding to each bit of the to-be-computed data, and returns the authentication fingerprint corresponding to the computation result to the terminal, so that the terminal performs correctness authentication on the computation result according to the received authentication fingerprint corresponding to the computation result, which resolves a problem in the prior art that a process of calculating a random number except 1 or 0 in a process of computing an authentication fingerprint corresponding to each bit is complex because a first character string is a subset of a randomly-generated set $\{1, 2, \ldots, n-1, n\}$ and has a length of n/2. Therefore, complexity of an algorithm of the terminal and an amount of computation are effectively reduced.

In An embodiment of the apparatus for authenticating a fully homomorphic message according to the present disclosure, on the basis of the foregoing embodiment, the processing module 92 is specifically configured to: acquire the computation result of the to-be-computed data according to t bits of the to-be-computed data and by using the pre-configured computation function used to compute the to-be-computed data, where the pre-configured computation function used to compute the to-be-computed data is a hash tree, where: the hash tree includes t inputs and one output, and each node in the hash tree is a pre-configured secure hash function; and t is a total quantity of bits of the to-be-computed data.

Further, the authentication fingerprint corresponding to each bit of the to-be-computed data includes a first component and n second components, the message authentication key includes a computation key, and the processing module 92 is further configured to: acquire, according to first components of t authentication fingerprints corresponding to the t bits of the to-be-computed data and by using the pre-configured computation function used to compute the to-be-computed data, a first component of the authentication fingerprint corresponding to the computation result; and acquire, according to the computation result, the n second components of the authentication fingerprint corresponding to each bit of the to-be-computed data, and the computation key, and by using a ciphertext computation function in the pre-configured fully homomorphic encryption algorithm, n second components of the authentication fingerprint corresponding to the computation result.

That is, the authentication fingerprint corresponding to the computation result includes the first component of the authentication fingerprint corresponding to the computation result and the second component of the authentication fingerprint corresponding to the computation result.

The apparatus for authenticating a fully homomorphic message provided in this embodiment is configured to execute the technical solutions of the method embodiments shown in FIG. 1 to FIG. 7. The implementation principle and technical effect thereof are similar, and details are not described herein again.

Figure 10:
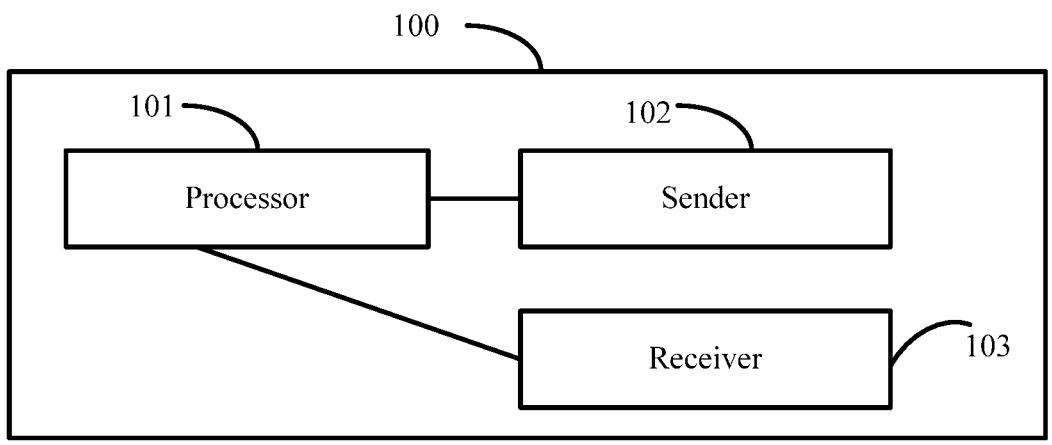
FIG. 10 is a schematic structural diagram of a terminal according to an embodiment of the present disclosure.

FIG. 10 is a schematic structural diagram of a terminal according to An embodiment of the present disclosure. As shown in FIG. 10, the terminal 100 includes: a processor 101, a sender 102, and a receiver 103. Specifically, the processor 101 is configured to acquire a message authentication key, where: the message authentication key includes a first character string and a second character string; the first character string is a character string that consists of 0 and 1 and has a length of n, and a quantity of characters 1 in the first character string is $2n/3$; the second character string is a character string that consists of 0 and 1 and has a length of n, and in the second character string, characters at locations corresponding to the characters 1 in the first character string include characters 0 whose quantity is $n/3$; and n is an integer greater than or equal to 2.

The processor 101 is further configured to generate, according to the message authentication key, an authentication fingerprint corresponding to each bit of to-be-computed data.

The sender 102 is configured to send a computation request to a server, where the computation request includes: the to-be-computed data, the authentication fingerprint corresponding to each bit of the to-be-computed data, a pre-configured fully homomorphic encryption algorithm, and the message authentication key.

The receiver 103 is configured to receive a computation result of the to-be-computed data and an authentication fingerprint corresponding to the computation result that are returned by the server.

The processor 101 is further configured to perform correctness authentication on the computation result according to the received authentication fingerprint corresponding to the computation result.

According to the terminal provided in this embodiment, on a premise that a verification requirement is met, a processor acquires a message authentication key, where the message authentication key includes: a first character string that is a character string that consists of 0 and 1 and has a length of n, where a quantity of characters 1 in the first character string is $2n/3$, and a second character string that is a character string that consists of 0 and 1 and has a length of n, where characters at locations corresponding to the characters 1 in the first character string include characters 0 whose quantity is $n/3$, and generates, according to the message authentication key, an authentication fingerprint corresponding to each bit of to-be-computed data; a sender sends the to-be-computed data, the authentication fingerprint corresponding to each bit, a fully homomorphic encryption algorithm, and the message authentication key to a server, so that the server obtains, by means of computation, a computation result of the to-be-computed data and an authentication fingerprint corresponding to the computation result, and returns the computation result and the authentication fingerprint corresponding to the computation result to the terminal; and the processor performs correctness authentication on the computation result according to the authentication fingerprint corresponding to the computation result that is received by a receiver. The first character string that consists of 0 and 1 and has a length of n and the second character string that consists of 0 and 1 and has a length of n are selected, where the quantity of the is in the first character string is $2n/3$, and in the second character string, the characters at the locations corresponding to the characters 1 in the first character string include characters 0 whose quantity is $n/3$; a ciphertext including $n2/3$ 0 and 1 is inserted into an acquired second component of the authentication fingerprint corresponding to each bit of the to-be-computed data, which resolves a problem in the prior art that a process of calculating a random number except 1 or 0 in a process of computing an authentication fingerprint corresponding to each bit is complex because a first character string is a subset of a randomly-generated set $\{1, 2, \ldots, n-1, n\}$ and has a length of $n/2$. Therefore, complexity of an algorithm of the terminal and an amount of computation are effectively reduced.

In An embodiment of the terminal according to the present disclosure, on the basis of the foregoing embodiment, the message authentication key further includes a public key, and the processor 101 is specifically configured to: generate, according to a pre-configured pseudo random function and a label of the $i^{th}$ bit of the to-be-computed data, a first component of an authentication fingerprint corresponding to the $i^{th}$ bit; generate, according to the pseudo random function, n pseudo random strings corresponding to the $i^{th}$ bit of the to-be-computed data; and generate, according to the first character string, the second character string, and the n pseudo random strings, n ciphertexts corresponding to the $i^{th}$ bit, where the ciphertexts serve as a second component of the authentication fingerprint corresponding to the $i^{th}$ bit, where: the $i^{th}$ bit, the public key, and the $j^{th}$ pseudo random string are input into the pre-configured encryption algorithm to generate the ciphertext if the $j^{th}$ character of the first character string is 0; or 0, the public key, and the $j^{th}$ pseudo random string are input into the pre-configured encryption algorithm to generate the ciphertext if the $j^{th}$ character of the first character string is 1 and the $j^{th}$ character of the second character string is 0; or 1, the public key, and the $j^{th}$ pseudo random string are input into the pre-configured encryption algorithm to generate the ciphertext if the $j^{th}$ character of the first character string is 1 and the $j^{th}$ character of the second character string is 1, where i is an integer that is greater than or equal to 1 and less than or equal to a total quantity t of bits of the to-be-computed data, and j is an integer that is greater than or equal to 1 and less than or equal to n.

Further, the processor 101 is specifically configured to: acquire a first component of the authentication fingerprint corresponding to the computation result, where the first component is obtained by means of recomputation; determine, by means of comparison, whether a first component of the received authentication fingerprint corresponding to the computation result is equal to the first component of the authentication fingerprint corresponding to the computation result, where the latter is obtained by means of recomputation; and continue performing correctness authentication on the computation result if the first component of the received authentication fingerprint corresponding to the computation result is equal to the first component of the authentication fingerprint corresponding to the computation result, where the latter is obtained by means of recomputation; or determine that the computation result is incorrect if the two are unequal.

Further, the processor 101 is specifically configured to: acquire, according to first components of t authentication fingerprints corresponding to the t bits of the to-be-computed data and by using a computation function used to compute the to-be-computed data, the first component of the authentication fingerprint corresponding to the computation result, where the first component is obtained by means of recomputation, where the computation function used to compute the to-be-computed data is a hash tree, where the hash tree includes t inputs and one output, and each node in the hash tree is a pre-configured secure hash function.

Optionally, the sender 102 is further configured to send first components of t authentication fingerprints corresponding to the t bits of the to-be-computed data to a third-party device, so that the third-party device acquires, according to the received first components of the t authentication fingerprints corresponding to the t bits of the to-be-computed data and by using a pre-configured computation function used to compute the to-be-computed data, the first component of the authentication fingerprint corresponding to the computation result, where the first component is obtained by means of recomputation.

The receiver 103 is further configured to receive the first component of the authentication fingerprint corresponding to the computation result, where the first component is obtained by means of recomputation and returned by the third-party device, and the computation function used to compute the to-be-computed data is a hash tree, where the hash tree includes t inputs and one output, and each node in the hash tree is the secure hash function.

Optionally, the message authentication key further includes a private key, and the processor 101 is further configured to: separately compute, according to the private key, n plaintexts corresponding to n second components of the received authentication fingerprint corresponding to the computation result; and determine that the computation result is correct if the n plaintexts are all the same as the computation result.

The terminal provided in this embodiment is configured to execute the technical solutions of the embodiments shown in FIG. 1 to FIG. 7. The implementation principle and technical effect thereof are similar, and details are not described herein again.

Figure 11:
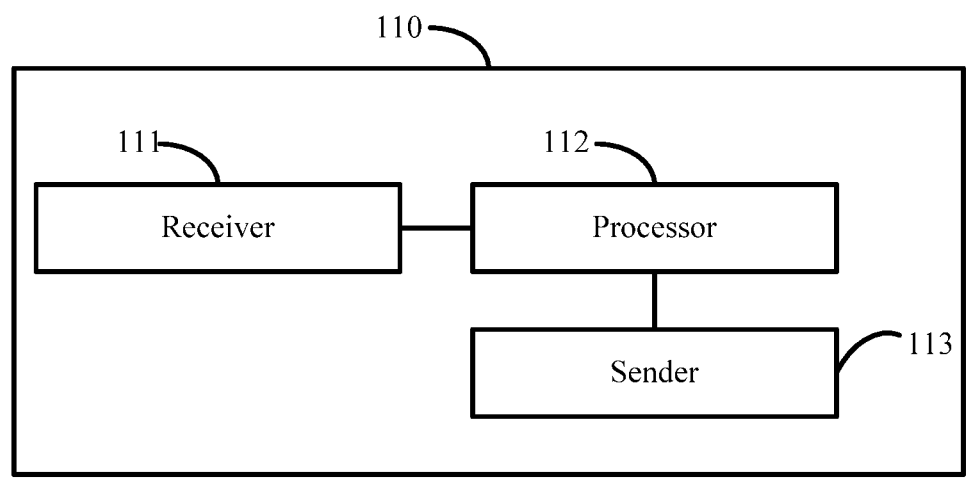
FIG. 11 is a schematic structural diagram of a server according to an embodiment of the present disclosure.

FIG. 11 is a schematic structural diagram of a server according to An embodiment of the present disclosure. As shown in the FIG. 11, the server 110 includes: a receiver 111, a processor 112, and a sender 113. Specifically, the receiver 111 is configured to receive a computation request sent by a terminal, where the computation request includes: to-be-computed data, an authentication fingerprint corresponding to each bit of the to-be-computed data, a fully homomorphic encryption algorithm, and a message authentication key.

The processor 112 is configured to obtain, by means of computation, a computation result of the to-be-computed data according to the to-be-computed data and a pre-configured computation function used to compute the to-be-computed data.

The processor 112 is further configured to compute an authentication fingerprint corresponding to the computation result according to the pre-configured computation function used to compute the to-be-computed data, the computation result of the to-be-computed data, the authentication fingerprint corresponding to each bit of the to-be-computed data, the pre-configured fully homomorphic encryption algorithm, and the message authentication key.

The sender 113 is configured to return, to the terminal, the computation result of the to-be-computed data and the authentication fingerprint corresponding to the computation result, so that the terminal performs correctness authentication on the computation result according to the received authentication fingerprint corresponding to the computation result.

According to the server provided in this embodiment, a receiver receives a computation request sent by a terminal, where the computation request includes a message authentication key; a processor obtains, by means of computation, a computation result of to-be-computed data according to a pre-configured computation function used to compute the to-be-computed data, acquires, by means of computation, an authentication fingerprint corresponding to the computation result according to the message authentication key, the computation result, and an authentication fingerprint corresponding to each bit of the to-be-computed data, and returns the authentication fingerprint corresponding to the computation result to the terminal, so that the terminal performs correctness authentication on the computation result according to the received authentication fingerprint corresponding to the computation result. A first character string that has a length of n and in which a quantity of characters 1 is 2n/3 and a second character string that has a length of n and in which characters at locations corresponding to the characters 1 in the first character string include characters 0 whose quantity is n/3 are selected, which resolves a problem in the prior art that a process of calculating a random number except 1 or 0 in a process of computing an authentication fingerprint corresponding to each bit is complex because a first character string is a subset of a randomly-generated set {1, 2, . . . , n−1, n} and has a length of n/2. Therefore, complexity of an algorithm of the terminal and an amount of computation are effectively reduced.

In An embodiment of the server according to the present disclosure, on the basis of the foregoing embodiment, the processor 112 is specifically configured to: acquire the computation result of the to-be-computed data according to t bits of the to-be-computed data and by using the pre-configured computation function used to compute the to-be-computed data, where the pre-configured computation function used to compute the to-be-computed data is a hash tree, where: the hash tree includes t inputs and one output, and each node in the hash tree is a pre-configured secure hash function; and t is a total quantity of bits of the to-be-computed data.

Further, the authentication fingerprint corresponding to each bit of the to-be-computed data includes a first component and n second components, the message authentication key includes a computation key, and the processor 112 is specifically configured to: acquire, according to first components of t authentication fingerprints corresponding to the t bits of the to-be-computed data and by using the pre-configured computation function used to compute the to-be-computed data, a first component of the authentication fingerprint corresponding to the computation result; and acquire, according to the computation result, the n second components of the authentication fingerprint corresponding to each bit of the to-be-computed data, and the computation key, and by using a ciphertext computation function in the pre-configured fully homomorphic encryption algorithm, n second components of the authentication fingerprint corresponding to the computation result.

The server provided in this embodiment is configured to execute the technical solutions of the method embodiments shown in FIG. 1 to FIG. 7. The implementation principle and technical effect thereof are similar, and details are not described herein again.

In addition, it should be understood that in An embodiment and An embodiment of the terminal and An embodiment and An embodiment of the server, the processor 101 and the processor 112 may be a central processing unit (Central Processing Unit, CPU for short), or may be another general purpose processor, a digital signal processor (Digital Signal Processor, DSP for short), an application-specific integrated circuit (Application-Specific Integrated Circuit, ASIC for short), a field-programmable gate array (Field-Programmable Gate Array, FPGA for short), another programmable logic device, a discrete gate or transistor logic device, a discrete hardware component, or the like. The general purpose processor may be a microprocessor or the processor may be any conventional processor or the like.

In an implementation process, the steps in the method embodiments shown in FIG. 1 to FIG. 7 may be completed by the terminal and the server by using an integrated logic circuit of hardware in the processor or an instruction in a form of software. Steps of the methods disclosed with reference to the embodiments of the present disclosure may be directly executed and accomplished by means of a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register.

The embodiments in this specification are all described in a progressive manner, for same or similar parts in the embodiments, refer to these embodiments, and each embodiment focuses on a difference from other embodiments. Especially, an apparatus embodiment is basically similar to a method embodiment, and therefore is described briefly; for related parts, refer to partial descriptions in the method embodiment. The described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. Persons of ordinary skill in the art may understand and implement the embodiments of the present disclosure without creative efforts.

Based on the description of the foregoing implementation manners, persons skilled in the art may clearly understand that the present disclosure may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may have various forms, for example, in a form of an analog circuit, a digital circuit, a dedicated circuit, or the like. However, as for the present disclosure, software program implementation is a better implementation manner in most cases. Based on such an understanding, the technical solutions of the present disclosure essentially or the part contributing to the prior art may be implemented in a form of a software product. The computer software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, and the like) to perform the methods described in the embodiments of the present disclosure.

Figure 12:
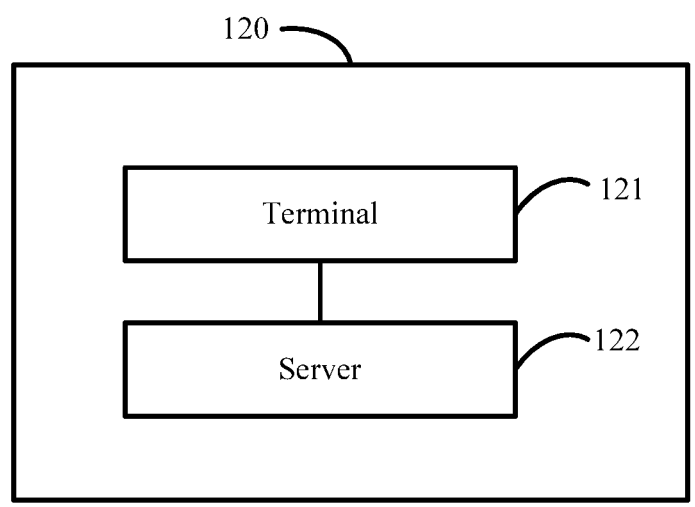
FIG. 12 is a schematic structural diagram of a system for authenticating a fully homomorphic message according to an embodiment of the present disclosure.

FIG. 12 is a schematic structural diagram of a system for authenticating a fully homomorphic message according to An embodiment of the present disclosure. As shown in FIG. 12, the system for authenticating a fully homomorphic message 120 includes a terminal 121 and a server 122.

The terminal 121 is configured to: acquire a message authentication key, where: the message authentication key includes a first character string and a second character string; the first character string is a character string that consists of 0 and 1 and has a length of n, and a quantity of characters 1 in the first character string is 2n/3; the second character string is a character string that consists of 0 and 1 and has a length of n, and in the second character string, characters at locations corresponding to the characters 1 in the first character string include characters 0 whose quantity is n/3; and n is an integer greater than or equal to 2; generate, according to a first input character, the public key, and a pseudo random string, one of n ciphertexts corresponding to the $i^{th}$ bit of to-be-computed data, and determine that the n ciphertexts are a second component of an authentication fingerprint corresponding to the $i^{th}$ bit, where: if the $j^{th}$ character of the first character string is 0, the first input character is the $i^{th}$ bit, or if the $j^{th}$ character of the first character string is 1 and the $j^{th}$ character of the second character string is 0, the first input character is 0, or if the $j^{th}$ character of the first character string is 1 and the $j^{th}$ character of the second character string is 1, the first input character is 1; the authentication fingerprint corresponding to the $i^{th}$ bit further includes a first component; i is an integer that is greater than or equal to 1 and less than or equal to a total quantity t of bits of the to-be-computed data, where t is greater than or equal to 1; and j is an integer that is greater than or equal to 1 and less than or equal to n; send a computation request to the server 122, where the computation request includes: the to-be-computed data, an authentication fingerprint corresponding to each bit of the to-be-computed data, a pre-configured fully homomorphic encryption algorithm, and the message authentication key; receive a computation result of the to-be-computed data and an authentication fingerprint corresponding to the computation result that are returned by the server; and perform correctness authentication on the computation result according to the received authentication fingerprint corresponding to the computation result.

The server 122 is configured to: receive the computation request sent by the terminal 121; obtain, by means of computation, the computation result of the to-be-computed data according to the to-be-computed data and a pre-configured computation function used to compute the to-be-computed data; compute the authentication fingerprint corresponding to the computation result according to the pre-configured computation function used to compute the to-be-computed data, the computation result of the to-be-computed data, the authentication fingerprint corresponding to each bit of the to-be-computed data, the pre-configured fully homomorphic encryption algorithm, and the message authentication key; and return, to the terminal, the computation result of the to-be-computed data and the authentication fingerprint corresponding to the computation result, so that the terminal performs correctness authentication on the computation result according to the received authentication fingerprint corresponding to the computation result.

According to the system for authenticating a fully homomorphic message provided in this embodiment, on a premise that a verification requirement is met, a terminal acquires a message authentication key, where the message authentication key includes: a first character string that is a character string that consists of 0 and 1 and has a length of n, where a quantity of characters 1 in the first character string is 2n/3, and a second character string that is a character string that consists of 0 and 1 and has a length of n, where characters at locations corresponding to the characters 1 in the first character string include characters 0 whose quantity is n/3; generates, according to the message authentication key, an authentication fingerprint corresponding to each bit of to-be-computed data; and sends the to-be-computed data, the authentication fingerprint corresponding to each bit, a fully homomorphic encryption algorithm, and the message authentication key to a server, so that the server obtains, by means of computation, a computation result of the to-be-computed data and an authentication fingerprint corresponding to the computation result, and returns the computation result and the authentication fingerprint corresponding to the computation result to the terminal; and the terminal performs correctness authentication on the computation result according to the authentication fingerprint corresponding to the computation result that is received by a receiver. The first character string that consists of 0 and 1 and has a length of n and the second character string that consists of 0 and 1 and has a length of n are selected, where the quantity of the is in the first character string is 2n/3, and in the second character string, the characters at the locations corresponding to the characters 1 in the first character string include characters 0 whose quantity is n/3; a ciphertext including n2/3 0 and 1 is inserted into an acquired second component of the authentication fingerprint corresponding to each bit of the to-be-computed data, which resolves a problem in the prior art that a process of calculating a random number except 1 or 0 in a process of computing an authentication fingerprint corresponding to each bit is complex because a first character string is a subset of a randomly-generated set $\{1, 2, \ldots, n-1, n\}$ and has a length of n/2. Therefore, complexity of an algorithm of the terminal and an amount of computation are effectively reduced.

On the basis of the foregoing embodiment, the terminal 121 is specifically configured to: generate, according to a pre-configured pseudo random function and a label of the $i^{th}$ bit of the to-be-computed data, the first component of the authentication fingerprint corresponding to the $i^{th}$ bit; generate, according to the pseudo random function, n pseudo random strings corresponding to the $i^{th}$ bit of the to-be-computed data; and generate, according to the first character string, the second character string, and the n pseudo random strings, the n ciphertexts corresponding to the $i^{th}$ bit, where the n ciphertexts serve as the second component of the authentication fingerprint corresponding to the $i^{th}$ bit, where: the $i^{th}$ bit, the public key, and the $j^{th}$ pseudo random string are input into the pre-configured encryption algorithm to generate the ciphertext if the $j^{th}$ character of the first character string is 0; or 0, the public key, and the $j^{th}$ pseudo random string are input into the pre-configured encryption algorithm to generate the ciphertext if the $j^{th}$ character of the first character string is 1 and the $j^{th}$ character of the second character string is 0; or 1, the public key, and the $j^{th}$ pseudo random string are input into the pre-configured encryption algorithm to generate the ciphertext if the $j^{th}$ character of the first character string is 1 and the $j^{th}$ character of the second character string is 1, where i is an integer that is greater than or equal to 1 and less than or equal to the total quantity t of the bits of the to-be-computed data, and j is an integer that is greater than or equal to 1 and less than or equal to n.

Optionally, the terminal 121 is further configured to: acquire a first component of the authentication fingerprint corresponding to the computation result, where the first component is obtained by means of recomputation; determine, by means of comparison, whether a first component of the received authentication fingerprint corresponding to the computation result is equal to the first component of the authentication fingerprint corresponding to the computation result, where the latter is obtained by means of recomputation; and continue performing correctness authentication on the computation result if the first component of the received authentication fingerprint corresponding to the computation result is equal to the first component of the authentication fingerprint corresponding to the computation result, where the latter is obtained by means of recomputation; or determine that the computation result is incorrect if the two are unequal.

Optionally, the terminal 121 is specifically configured to: acquire, according to first components of t authentication fingerprints corresponding to the t bits of the to-be-computed data and by using the computation function used to compute the to-be-computed data, the first component of the authentication fingerprint corresponding to the computation result, where the first component is obtained by means of recomputation; or send first components of t authentication fingerprints corresponding to the t bits of the to-be-computed data to a third-party device, so that the third-party device acquires, according to the received first components of the t authentication fingerprints corresponding to the t bits of the to-be-computed data and by using the pre-configured computation function used to compute the to-be-computed data, the first component of the authentication fingerprint corresponding to the computation result, where the first component is obtained by means of recomputation; and receive the first component of the authentication fingerprint corresponding to the computation result, where the first component is obtained by means of recomputation and returned by the third-party device, and the computation function used to compute the to-be-computed data is a hash tree, where the hash tree includes t inputs and one output, and each node in the hash tree is the secure hash function.

Optionally, the terminal 121 is further configured to: separately compute, according to the private key, n plaintexts corresponding to n second components of the received authentication fingerprint corresponding to the computation result; and determine that the computation result is correct if the n plaintexts are all the same as the computation result.

Optionally, the server 122 is specifically configured to: acquire the computation result of the to-be-computed data according to the t bits of the to-be-computed data and by using the pre-configured computation function used to compute the to-be-computed data, where the pre-configured computation function used to compute the to-be-computed data is a hash tree, where: the hash tree includes t inputs and one output, and each node in the hash tree is a pre-configured secure hash function; and t is the total quantity of the bits of the to-be-computed data.

Optionally, the server 122 is further configured to: acquire, according to the first components of the t authentication fingerprints corresponding to the t bits of the to-be-computed data and by using the pre-configured computation function used to compute the to-be-computed data, the first component of the authentication fingerprint corresponding to the computation result; and acquire, according to the computation result, n second components of the authentication fingerprint corresponding to each bit of the to-be-computed data, and the computation key, and by using a ciphertext computation function in the pre-configured fully homomorphic encryption algorithm, the n second components of the authentication fingerprint corresponding to the computation result.

The system for authenticating a fully homomorphic message provided in the foregoing embodiment is configured to execute the technical solution of any one of the method embodiments shown in FIG. 1 to FIG. 7. The implementation principle and technical effect thereof are similar, and details are not described herein again.

For the purposes of clarity, a number of permutations of the present disclosure will be discussed below. These represent various aspects of the present disclosure. While several specific examples are given, the scope of the disclosure should not be limited to these examples.

A first aspect of the present disclosure provides a method for authenticating a fully homomorphic message, where the method is applied to a terminal and includes: acquiring a message authentication key, where: the message authentication key includes a public key, a first character string, and a second character string; the first character string is a character string that consists of 0 and 1 and has a length of n, and a quantity of characters 1 in the first character string is 2n/3; the second character string is a character string that consists of 0 and 1 and has a length of n, and in the second character string, characters at locations corresponding to the characters 1 in the first character string include characters 0 whose quantity is n/3; and n is an integer greater than or equal to 2; generating, according to a first input character, the public key, and a pseudo random string, one of n ciphertexts corresponding to the $i^{th}$ bit of to-be-computed data, and determining that the n ciphertexts are a second component of an authentication fingerprint corresponding to the $i^{th}$ bit, where: if the $j^{th}$ character of the first character string is 0, the first input character is the $i^{th}$ bit, or if the $j^{th}$ character of the first character string is 1 and the $j^{th}$ character of the second character string is 0, the first input character is 0, or if the $j^{th}$ character of the first character string is 1 and the $j^{th}$ character of the second character string is 1, the first input character is 1; the authentication fingerprint corresponding to the $i^{th}$ bit further includes a first component; i is an integer that is greater than or equal to 1 and less than or equal to a total quantity t of bits of the to-be-computed data, where t is greater than or equal to 1; and j is an integer that is greater than or equal to 1 and less than or equal to n; sending a computation request to a server, where the computation request includes: the to-be-computed data, an authentication fingerprint corresponding to each bit of the to-be-computed data, a pre-configured fully homomorphic encryption algorithm, and the message authentication key; and receiving a computation result of the to-be-computed data and an authentication fingerprint corresponding to the computation result that are returned by the server; and performing correctness authentication on the computation result according to the received authentication fingerprint corresponding to the computation result.

With reference to the first aspect, in a first possible implementation manner of the first aspect, the authentication fingerprint corresponding to the $i^{th}$ bit is generated by executing the following steps: generating, according to a pre-configured pseudo random function and a label of the $i^{th}$ bit of the to-be-computed data, the first component of the authentication fingerprint corresponding to the $i^{th}$ bit; generating, according to the pseudo random function, n pseudo random strings corresponding to the $i^{th}$ bit of the to-be-computed data; and generating, according to the first character string, the second character string, and the n pseudo random strings, the n ciphertexts corresponding to the $i^{th}$ bit, where the n ciphertexts serve as the second component of the authentication fingerprint corresponding to the $i^{th}$ bit, where: the $i^{th}$ bit, the public key, and the $j^{th}$ pseudo random string are input into the pre-configured encryption algorithm to generate a ciphertext if the $j^{th}$ character of the first character string is 0; or 0, the public key, and the $j^{th}$ pseudo random string are input into the pre-configured encryption algorithm to generate a ciphertext if the $j^{th}$ character of the first character string is 1 and $j^{th}$ character of the second character string is 0; or 1, the public key, and the $j^{th}$ pseudo random string are input into the pre-configured encryption algorithm to generate a ciphertext if the $j^{th}$ character of the first character string is 1 and the $j^{th}$ character of the second character string is 1.

With reference to the first aspect or the first possible implementation manner of the first aspect, in a second possible implementation manner of the first aspect, the performing correctness authentication on the computation result according to the received authentication fingerprint corresponding to the computation result includes: acquiring a first component of the authentication fingerprint corresponding to the computation result, where the first component is obtained by means of recomputation; determining, by means of comparison, whether a first component of the received authentication fingerprint corresponding to the computation result is equal to the first component of the authentication fingerprint corresponding to the computation result, where the latter is obtained by means of recomputation; and continuing performing correctness authentication on the computation result if the first component of the received authentication fingerprint corresponding to the computation result is equal to the first component of the authentication fingerprint corresponding to the computation result, where the latter is obtained by means of recomputation; or determining that the computation result is incorrect if the two are unequal.

With reference to the second possible implementation manner of the first aspect, in a third possible implementation manner of the first aspect, the acquiring a first component of the authentication fingerprint corresponding to the computation result, where the first component is obtained by means of recomputation includes: acquiring, according to first components oft authentication fingerprints corresponding to the t bits of the to-be-computed data and by using a computation function used to compute the to-be-computed data, the first component of the authentication fingerprint corresponding to the computation result, where the first component is obtained by means of recomputation, where the computation function used to compute the to-be-computed data is a hash tree, where the hash tree includes t inputs and one output, and each node in the hash tree is a pre-configured secure hash function.

With reference to the second possible implementation manner of the first aspect, in a fourth possible implementation manner of the first aspect, the acquiring a first component of the authentication fingerprint corresponding to the computation result, where the first component is obtained by means of recomputation includes: sending first components oft authentication fingerprints corresponding to the t bits of the to-be-computed data to a third-party device, so that the third-party device acquires, according to the received first components of the t authentication fingerprints corresponding to the t bits of the to-be-computed data and by using a pre-configured computation function used to compute the to-be-computed data, the first component of the authentication fingerprint corresponding to the computation result, where the first component is obtained by means of recomputation; and receiving the first component of the authentication fingerprint corresponding to the computation result, where the first component is obtained by means of recomputation and returned by the third-party device, and the computation function used to compute the to-be-computed data is a hash tree, where the hash tree includes t inputs and one output, and each node in the hash tree is the secure hash function.

With reference to any one of the second to the fourth possible implementation manners of the first aspect, in a fifth possible implementation manner of the first aspect, the message authentication key further includes a private key, and the continuing performing correctness authentication on the computation result if the first component of the received authentication fingerprint corresponding to the computation result is equal to the first component, of the authentication fingerprint corresponding to the computation result, where the latter is obtained by means of recomputation includes: separately computing, according to the private key, n plaintexts corresponding to n second components of the received authentication fingerprint corresponding to the computation result; and determining that the computation result is correct if the n plaintexts are all the same as the computation result.

A second aspect of the present disclosure provides a method for authenticating a fully homomorphic message, where the method is applied to a server and includes: receiving a computation request sent by a terminal, where the computation request includes: to-be-computed data, an authentication fingerprint corresponding to each bit of the to-be-computed data, a fully homomorphic encryption algorithm, and a message authentication key; obtaining, by means of computation, a computation result of the to-be-computed data according to the to-be-computed data and a pre-configured computation function used to compute the to-be-computed data; computing an authentication fingerprint corresponding to the computation result according to the pre-configured computation function used to compute the to-be-computed data, the computation result of the to-be-computed data, the authentication fingerprint corresponding to each bit of the to-be-computed data, the pre-configured fully homomorphic encryption algorithm, and the message authentication key; and returning, to the terminal, the computation result of the to-be-computed data and the authentication fingerprint corresponding to the computation result, so that the terminal performs correctness authentication on the computation result according to the received authentication fingerprint corresponding to the computation result.

With reference to the second aspect, in a first possible implementation manner of the second aspect, the obtaining, by means of computation, a computation result of the to-be-computed data according to the to-be-computed data and a pre-configured computation function used to compute the to-be-computed data includes: acquiring the computation result of the to-be-computed data according to t bits of the to-be-computed data and by using the pre-configured computation function used to compute the to-be-computed data, where the pre-configured computation function used to compute the to-be-computed data is a hash tree, where: the hash tree includes t inputs and one output, and each node in the hash tree is a pre-configured secure hash function; and t is a total quantity of bits of the to-be-computed data.

With reference to the first possible implementation manner of the second aspect, in a second possible implementation manner of the second aspect, the authentication fingerprint corresponding to each bit of the to-be-computed data includes a first component and n second components, the message authentication key further includes a computation key, and the computing an authentication fingerprint corresponding to the computation result according to the pre-configured computation function used to compute the to-be-computed data, the computation result of the to-be-computed data, the authentication fingerprint corresponding to each bit of the to-be-computed data, the pre-configured fully homomorphic encryption algorithm, and the message authentication key includes: acquiring, according to first components of t authentication fingerprints corresponding to the t bits of the to-be-computed data and by using the pre-configured computation function used to compute the to-be-computed data, a first component of the authentication fingerprint corresponding to the computation result; and acquiring, according to the computation result, the n second components of the authentication fingerprint corresponding to each bit of the to-be-computed data, and the computation key, and by using a ciphertext computation function in the pre-configured fully homomorphic encryption algorithm, n second components of the authentication fingerprint corresponding to the computation result.

A third aspect of an embodiment of the present disclosure provides an apparatus for authenticating a fully homomorphic message, including: an acquiring module, configured to acquire a message authentication key, where: the message authentication key includes a public key, a first character string, and a second character string; the first character string is a character string that consists of 0 and 1 and has a length of n, and a quantity of characters 1 in the first character string is 2n/3; the second character string is a character string that consists of 0 and 1 and has a length of n, and in the second character string, characters at locations corresponding to the characters 1 in the first character string include characters 0 whose quantity is n/3; and n is an integer greater than or equal to 2; a generating module, configured to: generate, according to a first input character, the public key, and a pseudo random string, one of n ciphertexts corresponding to the $i^{th}$ bit of to-be-computed data, and determine that the n ciphertexts are a second component of an authentication fingerprint corresponding to the $i^{th}$ bit, where: if the $j^{th}$ character of the first character string is 0, the first input character is the $i^{th}$ bit, or if the $j^{th}$ character of the first character string is 1 and the $j^{th}$ character of the second character string is 0, the first input character is 0, or if the $j^{th}$ character of the first character string is 1 and the $j^{th}$ character of the second character string is 1, the first input character is 1; the authentication fingerprint corresponding to the $i^{th}$ bit further includes a first component; i is an integer that is greater than or equal to 1 and less than or equal to a total quantity t of bits of the to-be-computed data, where t is greater than or equal to 1; and j is an integer that is greater than or equal to 1 and less than or equal to n; a transceiver module, configured to send a computation request to a server, where the computation request includes: the to-be-computed data, an authentication fingerprint corresponding to each bit of the to-be-computed data, a pre-configured fully homomorphic encryption algorithm, and the message authentication key, where the transceiver module is further configured to receive a computation result of the to-be-computed data and an authentication fingerprint corresponding to the computation result that are returned by the server; and a processing module, configured to perform correctness authentication on the computation result according to the authentication fingerprint corresponding to the computation result that is received by the transceiver module.

With reference to the third aspect, in a first possible implementation manner of the third aspect, the generating module is specifically configured to: generate, according to a pre-configured pseudo random function and a label of the $i^{th}$ bit of the to-be-computed data, the first component of the authentication fingerprint corresponding to the $i^{th}$ bit; generate, according to the pseudo random function, n pseudo random strings corresponding to the $i^{th}$ bit of the to-be-computed data; and generate, according to the first character string, the second character string, and the n pseudo random strings, the n ciphertexts corresponding to the $i^{th}$ bit, where the n ciphertexts serve as the second component of the authentication fingerprint corresponding to the $i^{th}$ bit, where: the $i^{th}$ bit, the public key, and the $j^{th}$ pseudo random string are input into the pre-configured encryption algorithm to generate a ciphertext if the $j^{th}$ character of the first character string is 0; or 0, the public key, and the $j^{th}$ pseudo random string are input into the pre-configured encryption algorithm to generate a ciphertext if the $j^{th}$ character of the first character string is 1 and the $j^{th}$ character of the second character string is 0; or 1, the public key, and the $j^{th}$ pseudo random string are input into the pre-configured encryption algorithm to generate a ciphertext if the $j^{th}$ character of the first character string is 1 and $j^{th}$ character of the second character string is 1.

With reference to the third aspect and the first possible implementation manner of the third aspect, in a second possible implementation manner of the third aspect, the processing module is specifically configured to: acquire a first component of the authentication fingerprint corresponding to the computation result, where the first component is obtained by means of recomputation; determine, by means of comparison, whether a first component of the received authentication fingerprint corresponding to the computation result is equal to the first component of the authentication fingerprint corresponding to the computation result, where the latter is obtained by means of recomputation; and continue performing correctness authentication on the computation result if the first component of the received authentication fingerprint corresponding to the computation result is equal to the first component of the authentication fingerprint corresponding to the computation result, where the latter is obtained by means of recomputation; or determine that the computation result is incorrect if the two are unequal.

With reference to the second possible implementation manner of the third aspect, in a third possible implementation manner of the third aspect, the processing module is further configured to acquire, according to acquired first components of t authentication fingerprints corresponding to the t bits of the to-be-computed data and by using a computation function used to compute the to-be-computed data, the first component of the authentication fingerprint corresponding to the computation result, where the first component is obtained by means of recomputation, where the computation function used to compute the to-be-computed data is a hash tree, where the hash tree includes t inputs and one output, and each node in the hash tree is a pre-configured secure hash function.

With reference to the second possible implementation manner of the third aspect, in a fourth possible implementation manner of the third aspect, the transceiver module is further configured to: send first components of t authentication fingerprints corresponding to the t bits of the to-be-computed data to a third-party device, so that the third-party device acquires, according to the received first components of the t authentication fingerprints corresponding to the t bits of the to-be-computed data and by using a pre-configured computation function used to compute the to-be-computed data, the first component of the authentication fingerprint corresponding to the computation result, where the first component is obtained by means of recomputation; and receive the first component of the authentication fingerprint corresponding to the computation result, where the first component is obtained by means of recomputation and returned by the third-party device, and the computation function used to compute the to-be-computed data is a hash tree, where the hash tree includes t inputs and one output, and each node in the hash tree is the secure hash function.

With reference to any one of the second to the fourth possible implementation manners of the third aspect, in a fifth possible implementation manner of the third aspect, the message authentication key further includes a private key, and the processing module is further configured to: separately compute, according to the private key, n plaintexts corresponding to n second components of the received authentication fingerprint corresponding to the computation result; and determine that the computation result is correct if the n plaintexts are all the same as the computation result.

A fourth aspect of an embodiment of the present disclosure provides an apparatus for authenticating a fully homomorphic message, including: a transceiver module, configured to receive a computation request sent by a terminal, where the computation request includes: to-be-computed data, an authentication fingerprint corresponding to each bit of the to-be-computed data, a fully homomorphic encryption algorithm, and a message authentication key; and a processing module, configured to obtain, by means of computation, a computation result of the to-be-computed data according to the to-be-computed data and a pre-configured computation function used to compute the to-be-computed data, where the processing module is further configured to compute an authentication fingerprint corresponding to the computation result according to the pre-configured computation function used to compute the to-be-computed data, the computation result of the to-be-computed data, the authentication fingerprint corresponding to each bit of the to-be-computed data, the pre-configured fully homomorphic encryption algorithm, and the message authentication key; and the transceiver module is further configured to return, to the terminal, the computation result of the to-be-computed data and the authentication fingerprint corresponding to the computation result, so that the terminal performs correctness authentication on the computation result according to the received authentication fingerprint corresponding to the computation result.

With reference to the fourth aspect, in a first possible implementation manner of the fourth aspect, the processing module is specifically configured to: acquire the computation result of the to-be-computed data according to t bits of the to-be-computed data and by using the pre-configured computation function used to compute the to-be-computed data, where the pre-configured computation function used to compute the to-be-computed data is a hash tree, where: the hash tree includes t inputs and one output, and each node in the hash tree is a pre-configured secure hash function; and t is a total quantity of bits of the to-be-computed data.

With reference to the first possible implementation manner of the fourth aspect, in a second possible implementation manner of the fourth aspect, the authentication fingerprint corresponding to each bit of the to-be-computed data includes a first component and n second components, the message authentication key includes a computation key, and the processing module is further configured to: acquire, according to first components of t authentication fingerprints corresponding to the t bits of the to-be-computed data and by using the pre-configured computation function used to compute the to-be-computed data, a first component of the authentication fingerprint corresponding to the computation result; and acquire, according to the computation result, the n second components of the authentication fingerprint corresponding to each bit of the to-be-computed data, and the computation key, and by using a ciphertext computation function in the pre-configured fully homomorphic encryption algorithm, n second components of the authentication fingerprint corresponding to the computation result.

A fifth aspect of the present disclosure provides a system for authenticating a fully homomorphic message, where the system includes a terminal and a server, where: the terminal is configured to: acquire a message authentication key, where: the message authentication key includes a first character string and a second character string; the first character string is a character string that consists of 0 and 1 and has a length of n, and a quantity of characters 1 in the first character string is $2n/3$; the second character string is a character string that consists of 0 and 1 and has a length of n, and in the second character string, characters at locations corresponding to the characters 1 in the first character string include characters 0 whose quantity is $n/3$; and n is an integer greater than or equal to 2; generate, according to a first input character, a public key, and a pseudo random string, one of n ciphertexts corresponding to the $i^{th}$ bit of to-be-computed data, and determine that the n ciphertexts are a second component of an authentication fingerprint corresponding to the $i^{th}$ bit, where: if the $j^{th}$ character of the first character string is 0, the first input character is the $i^{th}$ bit, or if the $j^{th}$ character of the first character string is 1 and the $j^{th}$ character of the second character string is 0, the first input character is 0, or if the $j^{th}$ character of the first character string is 1 and the $j^{th}$ character of the second character string is 1, the first input character is 1; the authentication fingerprint corresponding to the $i^{th}$ bit further includes a first component; i is an integer that is greater than or equal to 1 and less than or equal to a total quantity t of bits of the to-be-computed data, where t is greater than or equal to 1; and j is an integer that is greater than or equal to 1 and less than or equal to n; send a computation request to the server, where the computation request includes: the to-be-computed data, an authentication fingerprint corresponding to each bit of the to-be-computed data, a pre-configured fully homomorphic encryption algorithm, and the message authentication key; receive a computation result of the to-be-computed data and an authentication fingerprint corresponding to the computation result that are returned by the server; and perform correctness authentication on the computation result according to the received authentication fingerprint corresponding to the computation result; and the server is configured to: receive the computation request sent by the terminal; obtain, by means of computation, the computation result of the to-be-computed data according to the to-be-computed data and a pre-configured computation function used to compute the to-be-computed data; compute the authentication fingerprint corresponding to the computation result according to the pre-configured computation function used to compute the to-be-computed data, the computation result of the to-be-computed data, the authentication fingerprint corresponding to each bit of the to-be-computed data, the pre-configured fully homomorphic encryption algorithm, and the message authentication key; and return, to the terminal, the computation result of the to-be-computed data and the authentication fingerprint corresponding to the computation result, so that the terminal performs correctness authentication on the computation result according to the received authentication fingerprint corresponding to the computation result.

With reference to the fifth aspect, in a first possible implementation manner of the fifth aspect, the terminal is specifically configured to: generate, according to a pre-configured pseudo random function and a label of the $i^{th}$ bit of the to-be-computed data, the first component of the authentication fingerprint corresponding to the $i^{th}$ bit; generate, according to the pseudo random function, n pseudo random strings corresponding to the $i^{th}$ bit of the to-be-computed data; and generate, according to the first character string, the second character string, and the n pseudo random strings, the n ciphertexts corresponding to the $i^{th}$ bit, where the n ciphertexts serve as the second component of the authentication fingerprint corresponding to the $i^{th}$ bit, where: the $i^{th}$ bit, the public key, and the $j^{th}$ pseudo random string are input into the pre-configured encryption algorithm to generate the ciphertext if the $j^{th}$ character of the first character string is 0; or 0, the public key, and the $j^{th}$ pseudo random string are input into the pre-configured encryption algorithm to generate the ciphertext if the $j^{th}$ character of the first character string is 1 and the $j^{th}$ character of the second character string is 0; or 1, the public key, and the $j^{th}$ pseudo random string are input into the pre-configured encryption algorithm to generate the ciphertext if the $j^{th}$ character of the first character string is 1 and $j^{th}$ character of the second character string is 1, where i is an integer that is greater than or equal to 1 and less than or equal to the total quantity t of the bits of the to-be-computed data, and j is an integer that is greater than or equal to 1 and less than or equal to n.

It can be learned that, according to the method for authenticating a fully homomorphic message, apparatus, and system that are provided in the embodiments of the present disclosure, on a premise that security verification is met, a first character string that consists of 0 and 1 and has a length of n and a second character string that consists of 0 and 1 and has a length of n are selected, where a quantity of characters 1 in the first character string is $2n/3$, and in the second character string, characters at locations corresponding to the characters 1 in the first character string include characters 0 whose quantity is $n/3$, which resolves a problem in the prior art that a process of calculating a random number except 1 or 0 in a process of computing an authentication fingerprint corresponding to each bit is complex because a first character string is a subset of a randomly-generated set $\{1, 2, \ldots, n-1, n\}$ and has a length of $n/2$. Therefore, an amount of computation is effectively reduced in a verification process, and efficiency of verifying a computation result of a server is improved.

It should be noted that the described apparatus embodiment is merely exemplary. The units described as separate parts may or may not be physically separate, and parts displayed as units may or may not be physical units, may be located in one position, or may be distributed on a plurality of network units. Some or all of the modules may be selected according to actual requirements to achieve the objectives of the solutions of the embodiments. In addition, in the accompanying drawings of the apparatus embodiments provided by the present disclosure, connection relationships between modules indicate that the modules have communication connections with each other, which may be specifically implemented as one or more communications buses or signal cables. Persons of ordinary skill in the art may understand and implement the embodiments of the present disclosure without creative efforts.

Based on the description of the foregoing implementation manners, persons skilled in the art may clearly understand that the present disclosure may be implemented by software in addition to necessary universal hardware, or by dedicated hardware, including a dedicated integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may have various forms, for example, in a form of an analog circuit, a digital circuit, a dedicated circuit, or the like. However, as for the present disclosure, software program implementation is a better implementation manner in most cases. Based on such an understanding, the technical solutions of the present disclosure essentially or the part contributing to the prior art may be implemented in a form of a software product. The computer software product is stored in a readable storage medium, such as a floppy disk, a USB flash drive, a removable hard disk, a read-only memory (ROM, Read-Only Memory), a random access memory (RAM, Random Access Memory), a magnetic disk, or an optical disc of a computer, and includes several instructions for instructing a computer device (which may be a personal computer, a server, a network device, and the like) to perform the methods described in the embodiments of the present disclosure.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof without departing from the scope of the technical solutions of the embodiments of the present disclosure.

What is claimed is:

1. A method for authenticating a fully homomorphic message, wherein the method is applied to a terminal and comprises:
    acquiring a message authentication key that comprises a public key, a first character string, and a second character string; the first character string is a character string that consists of 0 and 1 and has a length of n, and a quantity of characters 1 in the first character string is 2n/3; the second character string is a character string that consists of 0 and 1 and has a length of n, and in the second character string, characters at locations corresponding to the character 1 in the first character string comprise character 0 whose quantity is n/3; and n is an integer greater than or equal to 2;
    generating, according to a first input character, the public key, and a pseudo random string, one of n ciphertexts corresponding to the $i^{th}$ bit of to-be-computed data, and determining that the n ciphertexts are a second component of an authentication fingerprint corresponding to the $i^{th}$ bit, wherein: if the $j^{th}$ character of the first character string is 0, the first input character is the $i^{th}$ bit, or if the $j^{th}$ character of the first character string is 1 and the $j^{th}$ character of the second character string is 0, the first input character is 0, or if the $j^{th}$ character of the first character string is 1 and the $j^{th}$ character of the second character string is 1, the first input character is 1; the authentication fingerprint corresponding to the $i^{th}$ bit further comprises a first component; i is an integer that is greater than or equal to 1 and less than or equal to a total quantity t of bits of the to-be-computed data, wherein t is greater than or equal to 1; and j is an integer that is greater than or equal to 1 and less than or equal to n;
    sending a computation request to a server comprising the to-be-computed data, an authentication fingerprint corresponding to each bit of the to-be-computed data, a pre-configured fully homomorphic encryption algorithm, and the message authentication key;
    receiving a computation result of the to-be-computed data and an authentication fingerprint corresponding to the computation result that are returned by the server; and
    performing correctness authentication on the computation result according to the received authentication fingerprint corresponding to the computation result.

2. The method according to claim 1, wherein the authentication fingerprint corresponding to the $i^{th}$ bit is generated by executing the following steps:
    generating, according to a pre-configured pseudo random function and a label of the $i^{th}$ bit of the to-be-computed data, the first component of the authentication fingerprint corresponding to the $i^{th}$ bit;
    generating, according to the pseudo random function, n pseudo random strings corresponding to the $i^{th}$ bit of the to-be-computed data; and
    generating, according to the first character string, the second character string, and the n pseudo random strings, the n ciphertexts corresponding to the $i^{th}$ bit, wherein the n ciphertexts serve as the second component of the authentication fingerprint corresponding to the $i^{th}$ bit, wherein: the $i^{th}$ bit, the public key, and the $j^{th}$ pseudo random string are input into the pre-configured encryption algorithm to generate a ciphertext if the $j^{th}$ character of the first character string is 0; or 0, the public key, and the $j^{th}$ pseudo random string are input into the pre-configured encryption algorithm to generate a ciphertext if the $j^{th}$ character of the first character string is 1 and the $j^{th}$ character of the second character string is 0; or 1, the public key, and the $j^{th}$ pseudo random string are input into the pre-configured encryption algorithm to generate a ciphertext if the $j^{th}$ character of the first character string is 1 and the $j^{th}$ character of the second character string is 1.

3. The method according to claim 2, wherein the performing correctness authentication on the computation result according to the received authentication fingerprint corresponding to the computation result comprises:
    acquiring a first component of the authentication fingerprint corresponding to the computation result, wherein the first component is obtained by means of recomputation;
    determining, by means of comparison, whether a first component of the received authentication fingerprint corresponding to the computation result is equal to the first component of the authentication fingerprint corresponding to the computation result, wherein the latter is obtained by means of recomputation; and
    performing correctness authentication on the computation result if the first component of the received authentication fingerprint corresponding to the computation result is equal to the first component of the authentication fingerprint corresponding to the computation result, wherein the latter is obtained by means of recomputation; or determining that the computation result is incorrect if the two are unequal.

4. The method according to claim 3, wherein the acquiring a first component of the authentication fingerprint corresponding to the computation result, wherein the first component is obtained by means of recomputation comprises:
    acquiring, according to first components oft authentication fingerprints corresponding to the t bits of the to-be-computed data and by using a computation function used to compute the to-be-computed data, the first component of the authentication fingerprint corresponding to the computation result, wherein the first component is obtained by means of recomputation, wherein the computation function used to compute the to-be-computed data is a hash tree, wherein the hash tree comprises t inputs and one output, and each node in the hash tree is a pre-configured secure hash function.

5. The method according to claim 3, wherein the acquiring a first component of the authentication fingerprint corresponding to the computation result, wherein the first component is obtained by means of recomputation comprises:

sending first components oft authentication fingerprints corresponding to the t bits of the to-be-computed data to a third-party device, so that the third-party device acquires, according to the received first components of the t authentication fingerprints corresponding to the t bits of the to-be-computed data and by using a pre-configured computation function used to compute the to-be-computed data, the first component of the authentication fingerprint corresponding to the computation result, wherein the first component is obtained by means of recomputation; and receiving the first component of the authentication fingerprint corresponding to the computation result, wherein the first component is obtained by means of recomputation and returned by the third-party device, and the computation function used to compute the to-be-computed data is a hash tree, wherein the hash tree comprises t inputs and one output, and each node in the hash tree is a secure hash function.

6. The method according to claim 3, wherein the message authentication key further comprises a private key, and the continuing performing correctness authentication on the computation result if the first component of the received authentication fingerprint corresponding to the computation result is equal to the first component of the authentication fingerprint corresponding to the computation result, wherein the first component is obtained by means of recomputation comprises:

separately computing, according to the private key, n plaintexts corresponding to n second components of the received authentication fingerprint corresponding to the computation result; and determining that the computation result is correct if the n plaintexts are all the same as the computation result.

7. A method for authenticating a fully homomorphic message, wherein the method is applied to a server and comprises:

receiving a computation request sent by a terminal, wherein the computation request comprises: to-be-computed data, an authentication fingerprint corresponding to each bit of the to-be-computed data, a pre-configured fully homomorphic encryption algorithm, and a message authentication key;

obtaining, by means of computation, a computation result of the to-be-computed data according to the to-be-computed data and a pre-configured computation function used to compute the to-be-computed data;

computing an authentication fingerprint corresponding to the computation result according to the pre-configured computation function used to compute the to-be-computed data, the computation result of the to-be-computed data, the authentication fingerprint corresponding to each bit of the to-be-computed data, the pre-configured fully homomorphic encryption algorithm, and the message authentication key; and returning, to the terminal, the computation result of the to-be-computed data and the authentication fingerprint corresponding to the computation result, so that the terminal performs correctness authentication on the computation result according to the received authentication fingerprint corresponding to the computation result.

8. The method according to claim 7, wherein the obtaining, by means of computation, a computation result of the to-be-computed data according to the to-be-computed data and a pre-configured computation function used to compute the to-be-computed data comprises:

acquiring the computation result of the to-be-computed data according to t bits of the to-be-computed data and by using the pre-configured computation function used to compute the to-be-computed data, wherein the pre-configured computation function used to compute the to-be-computed data is a hash tree, wherein: the hash tree comprises t inputs and one output, and each node in the hash tree is a pre-configured secure hash function; and t is a total quantity of bits of the to-be-computed data.

9. The method according to claim 8, wherein the authentication fingerprint corresponding to each bit of the to-be-computed data comprises a first component and n second components, the message authentication key comprises a computation key, and the computing an authentication fingerprint corresponding to the computation result according to the pre-configured computation function used to compute the to-be-computed data, the computation result of the to-be-computed data, the authentication fingerprint corresponding to each bit of the to-be-computed data, the pre-configured fully homomorphic encryption algorithm, and the message authentication key comprises:

acquiring, according to first components oft authentication fingerprints corresponding to the t bits of the to-be-computed data and by using the pre-configured computation function used to compute the to-be-computed data, a first component of the authentication fingerprint corresponding to the computation result; and acquiring, according to the computation result, the n second components of the authentication fingerprint corresponding to each bit of the to-be-computed data, and the computation key, and by using a ciphertext computation function in the pre-configured fully homomorphic encryption algorithm, n second components of the authentication fingerprint corresponding to the computation result.

10. An apparatus for authenticating a fully homomorphic message, comprising:

an acquiring terminal, configured to acquire a message authentication key, wherein: the message authentication key comprises a public key, a first character string, and a second character string; the first character string is a character string that consists of 0 and 1 and has a length of n, and a quantity of characters 1 in the first character string is 2n/3; the second character string is a character string that consists of 0 and 1 and has a length of n, and in the second character string, characters at locations corresponding to the characters 1 in the first character string comprise characters 0 whose quantity is n/3; and n is an integer greater than or equal to 2;

a generating terminal, configured to: generate, according to a first input character, the public key, and a pseudo random string, one of n ciphertexts corresponding to the ith bit of to-be-computed data, and determine that the n ciphertexts are a second component of an authentication fingerprint corresponding to the ith bit, wherein: if the jth character of the first character string is 0, the first input character is the ith bit, or if the jth character of the first character string is 1 and the jth character of the second character string is 0, the first input character is 0, or if the jth character of the first character string is 1 and the jth character of the second character string is 1, the first input character is 1; the authentication fingerprint corresponding to the ith bit further comprises a first component; i is an integer that is greater than or equal to 1 and less than or equal to a total quantity t of bits of the to-be-computed data, wherein t is greater than or equal to 1; and j is an integer that is greater than or equal to 1 and less than or equal to n;

a transceiver terminal, configured to send a computation request to a server, wherein the computation request comprises: the to-be-computed data, an authentication fingerprint corresponding to each bit of the to-be-computed data, a pre-configured fully homomorphic encryption algorithm, and the message authentication key, wherein the transceiver terminal is further configured to receive a computation result of the to-be-computed data and an authentication fingerprint corresponding to the computation result that are returned by the server; and a processing terminal, configured to perform correctness authentication on the computation result according to the authentication fingerprint corresponding to the computation result that is received by the transceiver terminal.

11. The apparatus according to claim 10, wherein the generating terminal is specifically configured to:

generate, according to a pre-configured pseudo random function and a label of the ith bit of the to-be-computed data, the first component of the authentication fingerprint corresponding to the ith bit;

generate, according to the pseudo random function, n pseudo random strings corresponding to the ith bit of the to-be-computed data; and generate, according to the first character string, the second character string, and the n pseudo random strings, the n ciphertexts corresponding to the ith bit, wherein the n ciphertexts serve as the second component of the authentication fingerprint corresponding to the ith bit, wherein: the bit, the public key, and the jth pseudo random string are input into the pre-configured encryption algorithm to generate a ciphertext if the jth character of the first character string is 0; or 0, the public key, and the jth pseudo random string are input into the pre-configured encryption algorithm to generate a ciphertext if the jth character of the first character string is 1 and the jth character of the second character string is 0; or 1, the public key, and the jth pseudo random string are input into the pre-configured encryption algorithm to generate a ciphertext if the jth character of the first character string is 1 and the jth character of the second character string is 1.

12. The apparatus according to claim 10, wherein the processing terminal is specifically configured to:

acquire a first component of the authentication fingerprint corresponding to the computation result, wherein the first component is obtained by means of recomputation;

determine, by means of comparison, whether a first component of the received authentication fingerprint corresponding to the computation result is equal to the first component of the authentication fingerprint corresponding to the computation result, wherein the latter is obtained by means of recomputation; and continue performing correctness authentication on the computation result if the first component of the received authentication fingerprint corresponding to the computation result is equal to the first component of the authentication fingerprint corresponding to the computation result, wherein the latter is obtained by means of recomputation; or determine that the computation result is incorrect if the two are unequal.

13. The apparatus according to claim 12, wherein the processing terminal is further configured to acquire, according to acquired first components of t authentication fingerprints corresponding to the t bits of the to-be-computed data and by using a computation function used to compute the to-be-computed data, the first component of the authentication fingerprint corresponding to the computation result, wherein the first component is obtained by means of recomputation, wherein the computation function used to compute the to-be-computed data is a hash tree, wherein the hash tree comprises t inputs and one output, and each node in the hash tree is a pre-configured secure hash function.

14. The apparatus according to claim 12, wherein the transceiver terminal is further configured to:

send first components oft authentication fingerprints corresponding to the t bits of the to-be-computed data to a third-party device, so that the third-party device acquires, according to the received first components of the t authentication fingerprints corresponding to the t bits of the to-be-computed data and by using a pre-configured computation function used to compute the to-be-computed data, the first component of the authentication fingerprint corresponding to the computation result, wherein the first component is obtained by means of recomputation; and receive the first component of the authentication fingerprint corresponding to the computation result, wherein the first component is obtained by means of recomputation and returned by the third-party device, and the computation function used to compute the to-be-computed data is a hash tree, wherein the hash tree comprises t inputs and one output, and each node in the hash tree is the secure hash function.

15. The apparatus according to claim 12, wherein the message authentication key further comprises a private key, and the processing terminal is further configured to:

separately compute, according to the private key, n plaintexts corresponding to n second components of the received authentication fingerprint corresponding to the computation result; and determine that the computation result is correct if the n plaintexts are all the same as the computation result.

16. An apparatus for authenticating a fully homomorphic message, comprising:

a transceiver terminal in a service, configured to receive a computation request sent by a terminal, wherein the computation request comprises: to-be-computed data, an authentication fingerprint corresponding to each bit of the to-be-computed data, a pre-configured fully homomorphic encryption algorithm, and a message authentication key; and a processing terminal in the service, configured to obtain, by means of computation, a computation result of the to-be-computed data according to the to-be-computed data and a pre-configured computation function used to compute the to-be-computed data, wherein the processing terminal is further configured to compute an authentication fingerprint corresponding to the computation result according to the pre-configured computation function used to compute the to-be-computed data, the computation result of the to-be-computed data, the authentication fingerprint corresponding to each bit of the to-be-computed data, the pre-configured fully homomorphic encryption algorithm, and the message authentication key; and the transceiver terminal is further configured to return, to the terminal, the computation result of the to-be-computed data and the authentication fingerprint corresponding to the computation result, so that the terminal performs correctness authentication on the computation result according to the received authentication fingerprint corresponding to the computation result.

17. The apparatus according to claim 16, wherein the processing terminal is specifically configured to:

acquire the computation result of the to-be-computed data according to t bits of the to-be-computed data and by using the pre-configured computation function used to compute the to-be-computed data, wherein the pre-configured computation function used to compute the to-be-computed data is a hash tree, wherein: the hash tree comprises t inputs and one output, and each node in the hash tree is a pre-configured secure hash function; and t is a total quantity of bits of the to-be-computed data.

18. The apparatus according to claim 17, wherein the authentication fingerprint corresponding to each bit of the to-be-computed data comprises a first component and n second components, the message authentication key comprises a computation key, and the processing terminal is further configured to:

acquire, according to first components of t authentication fingerprints corresponding to the t bits of the to-be-computed data and by using the pre-configured computation function used to compute the to-be-computed data, a first component of the authentication fingerprint corresponding to the computation result; and acquire, according to the computation result, the n second components of the authentication fingerprint corresponding to each bit of the to-be-computed data, and the computation key, and by using a ciphertext computation function in the pre-configured fully homomorphic encryption algorithm, n second components of the authentication fingerprint corresponding to the computation result.

19. A system for authenticating a fully homomorphic message, wherein the system comprises a terminal and a server, wherein:

the terminal is configured to: acquire a message authentication key, wherein: the message authentication key comprises a first character string and a second character string; the first character string is a character string that consists of 0 and 1 and has a length of n, and a quantity of characters 1 in the first character string is 2n/3; the second character string is a character string that consists of 0 and 1 and has a length of n, and in the second character string, characters at locations corresponding to the characters 1 in the first character string comprise characters 0 whose quantity is n/3; and n is an integer greater than or equal to 2; generate, according to a first input character, the public key, and a pseudo random string, one of n ciphertexts corresponding to the $i^{th}$ bit of to-be-computed data, and determine that the n ciphertexts are a second component of an authentication fingerprint corresponding to the $i^{th}$ bit, wherein: if the $j^{th}$ character of the first character string is 0, the first input character is the $i^{th}$ bit, or if the $j^{th}$ character of the first character string is 1 and the $j^{th}$ character of the second character string is 0, the first input character is 0, or if the $j^{th}$ character of the first character string is 1 and the $j^{th}$ character of the second character string is 1, the first input character is 1; the authentication fingerprint corresponding to the $i^{th}$ bit further comprises a first component; i is an integer that is greater than or equal to 1 and less than or equal to a total quantity t of bits of the to-be-computed data, wherein t is greater than or equal to 1; and j is an integer that is greater than or equal to 1 and less than or equal to n; send a computation request to the server, wherein the computation request comprises: the to-be-computed data, an authentication fingerprint corresponding to each bit of the to-be-computed data, a pre-configured fully homomorphic encryption algorithm, and the message authentication key; receive a computation result of the to-be-computed data and an authentication fingerprint corresponding to the computation result that are returned by the server; and perform correctness authentication on the computation result according to the received authentication fingerprint corresponding to the computation result; and the server is configured to: receive the computation request sent by the terminal; obtain, by means of computation, the computation result of the to-be-computed data according to the to-be-computed data and a pre-configured computation function used to compute the to-be-computed data; compute the authentication fingerprint corresponding to the computation result according to the pre-configured computation function used to compute the to-be-computed data, the computation result of the to-be-computed data, the authentication fingerprint corresponding to each bit of the to-be-computed data, the pre-configured fully homomorphic encryption algorithm, and the message authentication key; and return, to the terminal, the computation result of the to-be-computed data and the authentication fingerprint corresponding to the computation result, so that the terminal performs correctness authentication on the computation result according to the received authentication fingerprint corresponding to the computation result.

20. The system according to claim 19, wherein the terminal is specifically configured to: generate, according to a pre-configured pseudo random function and a label of the $i^{th}$ bit of the to-be-computed data, the first component of the authentication fingerprint corresponding to the $i^{th}$ bit; generate, according to the pseudo random function, n pseudo random strings corresponding to the $i^{th}$ bit of the to-be-computed data; and generate, according to the first character string, the second character string, and the n pseudo random strings, the n ciphertexts corresponding to the $i^{th}$ bit, wherein the n ciphertexts serve as the second component of the authentication fingerprint corresponding to the $i^{th}$ bit, wherein: the $i^{th}$ bit, the public key, and the $j^{th}$ pseudo random string are input into the pre-configured encryption algorithm to generate a ciphertext if the $j^{th}$ character of the first character string is 0; or 0, the public key, and the $j^{th}$ pseudo random string are input into the pre-configured encryption algorithm to generate the ciphertext if the $j^{th}$ character of the first character string is 1 and the $j^{th}$ character of the second character string is 0; or 1, the public key, and the $j^{th}$ pseudo random string are input into the pre-configured encryption algorithm to generate the ciphertext if the $j^{th}$ character of the first character string is 1 and the $j^{th}$ character of the second character string is 1, wherein i is an integer that is greater than or equal to 1 and less than or equal to the total quantity t of the bits of the to-be-computed data, and j is an integer that is greater than or equal to 1 and less than or equal to n.

21. A method for authenticating, comprising:
acquiring a message authentication key, wherein the message authentication key comprises a public key, a first character string consisting of 0 and 1 with a length of n with a quantity of characters 1 of 2n/3, and a second character string consisting of 0 and 1 and has a length of n;
generating, according to a first input character, the public key, and a pseudo random string, a plurality of ciphertexts corresponding to the $i^{th}$ bit of to-be-computed data, and determining that the plurality of ciphertexts are a second component of an authentication fingerprint corresponding to the $i^{th}$ bit,
sending a computation request to a server, wherein the computation request comprises the to-be-computed data, an authentication fingerprint corresponding to each bit of the to-be-computed data, a pre-configured fully homomorphic encryption algorithm, and the message authentication key;
receiving a computation result of the to-be-computed data and an authentication fingerprint corresponding to the computation result that are returned by the server; and
performing correctness authentication on the computation result according to the received authentication fingerprint corresponding to the computation result.

22. The method of claim 21, wherein if the $j^{th}$ character of the first character string is 0, the first input character is the $i^{th}$ bit.

23. The method of claim 21, wherein if the $j^{th}$ character of the first character string is 1 and the $j^{th}$ character of the second character string is 0, the first input character is 0.

24. The method of claim 21, wherein if the $j^{th}$ character of the first character string is 1 and the $j^{th}$ character of the second character string is 1, the first input character is 1.

25. The method of claim 21, wherein the authentication fingerprint corresponding to the $i^{th}$ bit further comprises a first component, i, that is an integer that is greater than or equal to 1 and less than or equal to a total quantity t of bits of the to-be-computed data, wherein t is greater than or equal to 1; and j is an integer that is greater than or equal to 1 and less than or equal to n.

* * * * *